(12) United States Patent
Dods et al.

(10) Patent No.: US 12,141,267 B1
(45) Date of Patent: *Nov. 12, 2024

(54) RECIPIENT CREDENTIALING LEVERAGING PRIVATE KEYS ON KEYSTORES READ BY PROVISIONED DEVICES

(71) Applicant: LedgerDomain Inc., Las Vegas, NV (US)

(72) Inventors: Victor Bovee Dods, Seattle, WA (US); Benjamin James Taylor, Las Vegas, NV (US); Benjamin Gregory Nichols, New Plymouth (NZ)

(73) Assignee: LedgerDomain Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/239,061

(22) Filed: Aug. 28, 2023

Related U.S. Application Data

(63) Continuation of application No. 17/982,507, filed on Nov. 7, 2022, now Pat. No. 11,741,215.

(51) Int. Cl.
 *G06F 21/45* (2013.01)
 *G06F 21/00* (2013.01)
 *G06F 21/60* (2013.01)

(52) U.S. Cl.
 CPC ............ *G06F 21/45* (2013.01); *G06F 21/604* (2013.01)

(58) Field of Classification Search
 CPC ........ G06F 21/45; G06F 21/604; G06F 21/31; G06F 21/33; G06F 21/46; G06F 21/6245; G06F 21/6254; G06F 21/6263
 See application file for complete search history.

(56) References Cited

U.S. PATENT DOCUMENTS

| 7,170,391 B2 | 1/2007 | Lane et al. |
| 9,870,508 B1 | 1/2018 | Hodgson et al. |

(Continued)

FOREIGN PATENT DOCUMENTS

| CN | 110597902 A | 12/2019 |
| WO | 2018206408 A1 | 11/2018 |

(Continued)

OTHER PUBLICATIONS

Mitre, Broad Coalition of Health and Technology Industry Leaders Announce Vaccination Credential Initiative to Accelerate Digital Access to COVID-19 Vaccination Records, dated Jan. 14, 2021, 5 pages. Retrieved on Oct. 3, 2021. Retrieved from the internet [URL: https://www.businesswire.com/news/home/20210114005294/en/Broad-Coalition-of-Health-and-Technology-Industry-Leaders-Announce-Vaccination-Credential-Initiative-to-Accelerate-Digital-Access-to-COVID-19-Vaccination-Records ].

(Continued)

*Primary Examiner* — Edward Zee
(74) *Attorney, Agent, or Firm* — HAYNES BEFFEL & WOLFELD LLP; Andrew L. Dunlap; Paul A. Durdik

(57) ABSTRACT

The disclosed technology teaches an implementation for leveraging self-sovereign credentials held on mobile devices to provision credentials that empower one party ("recipient" or "user", used synonymously herein) to obtain credentialed access to information and resources on behalf of another party ("sender" or "administrator", used synonymously herein), without either party exposing private key information to each other or to the cloud. The sender is able to revoke user credentials at any time. Parties are able to leverage commodity hardware to automatically mutually authenticate their credentials and access available relevant options and workflows.

21 Claims, 16 Drawing Sheets

(56) References Cited

U.S. PATENT DOCUMENTS

| | | | |
|---|---|---|---|
| 10,268,974 B2 | 4/2019 | Wiig et al. |
| 10,356,087 B1 | 7/2019 | Vetter et al. |
| 10,491,404 B1 | 11/2019 | Yamamoto |
| 10,491,578 B1 | 11/2019 | Hebert et al. |
| 10,496,802 B2 | 12/2019 | Weis |
| 10,509,684 B2 | 12/2019 | Florissi et al. |
| 10,516,525 B2 | 12/2019 | Bhattacharya et al. |
| 10,540,704 B2 | 1/2020 | Mazed et al. |
| 10,542,046 B2 | 1/2020 | Katragadda et al. |
| 10,990,693 B1 | 4/2021 | Newman |
| 11,468,046 B2 | 10/2022 | Conley et al. |
| 11,509,709 B1 | 11/2022 | Basak et al. |
| 11,736,290 B1 | 8/2023 | Dods et al. |
| 11,741,215 B1 | 8/2023 | Dods et al. |
| 11,741,216 B1 | 8/2023 | Dods et al. |
| 11,769,577 B1 | 9/2023 | Dods et al. |
| 11,829,510 B2 | 11/2023 | Dods et al. |
| 11,848,754 B1 | 12/2023 | Dods et al. |
| 2012/0130905 A1 | 5/2012 | Tsudik et al. |
| 2014/0006048 A1 | 1/2014 | Liberty |
| 2014/0025443 A1 | 1/2014 | Onischuk |
| 2014/0040153 A1 | 2/2014 | Singh et al. |
| 2014/0108043 A1 | 4/2014 | Ach et al. |
| 2015/0039700 A1 | 2/2015 | West et al. |
| 2015/0262171 A1* | 9/2015 | Langschaedel ......... H04L 51/08 705/71 |
| 2015/0269379 A1 | 9/2015 | Ramzan et al. |
| 2016/0125199 A1 | 5/2016 | Lee et al. |
| 2016/0155069 A1 | 6/2016 | Hoover et al. |
| 2016/0212146 A1 | 7/2016 | Wilson |
| 2017/0103167 A1 | 4/2017 | Shah |
| 2017/0221032 A1 | 8/2017 | Mazed |
| 2017/0286880 A1 | 10/2017 | Wiig et al. |
| 2017/0310653 A1 | 10/2017 | Zhang |
| 2017/0337588 A1 | 11/2017 | Chittilappilly et al. |
| 2018/0048461 A1 | 2/2018 | Jutla et al. |
| 2018/0114169 A1 | 4/2018 | Wiig et al. |
| 2018/0139186 A1 | 5/2018 | Castagna |
| 2018/0341648 A1 | 11/2018 | Kakavand et al. |
| 2019/0012249 A1 | 1/2019 | Mercuri et al. |
| 2019/0020661 A1 | 1/2019 | Zhang |
| 2019/0026450 A1 | 1/2019 | Egner et al. |
| 2019/0051079 A1 | 2/2019 | Venkataraman et al. |
| 2019/0052453 A1 | 2/2019 | de Ligt |
| 2019/0057386 A1 | 2/2019 | Fazeli et al. |
| 2019/0058599 A1 | 2/2019 | Takada Chino et al. |
| 2019/0068562 A1 | 2/2019 | Iyer et al. |
| 2019/0075102 A1 | 3/2019 | Kim et al. |
| 2019/0108898 A1 | 4/2019 | Gulati |
| 2019/0138905 A1 | 5/2019 | Akella et al. |
| 2019/0138971 A1 | 5/2019 | Uggirala et al. |
| 2019/0141119 A1 | 5/2019 | Bernat et al. |
| 2019/0171438 A1 | 6/2019 | Franchitti |
| 2019/0180276 A1 | 6/2019 | Lee et al. |
| 2019/0222570 A1 | 7/2019 | Krishan |
| 2019/0228174 A1 | 7/2019 | Withrow et al. |
| 2019/0251295 A1 | 8/2019 | Vieyra |
| 2019/0281066 A1 | 9/2019 | Simons |
| 2019/0325507 A1 | 10/2019 | Rowley et al. |
| 2019/0333116 A1 | 10/2019 | Bhardwaj et al. |
| 2019/0334716 A1 | 10/2019 | Kocsis et al. |
| 2019/0392162 A1 | 12/2019 | Stern et al. |
| 2020/0005133 A1 | 1/2020 | Zhang et al. |
| 2020/0013229 A1 | 1/2020 | Lee et al. |
| 2020/0019288 A1 | 1/2020 | D'Amore et al. |
| 2020/0084483 A1 | 3/2020 | Brown et al. |
| 2020/0110821 A1 | 4/2020 | Chan et al. |
| 2020/0118060 A1 | 4/2020 | Mukherjee et al. |
| 2020/0137557 A1 | 4/2020 | Touati et al. |
| 2020/0153606 A1 | 5/2020 | Li et al. |
| 2020/0186358 A1 | 6/2020 | Capola et al. |
| 2020/0213218 A1 | 7/2020 | Demeilliez et al. |
| 2020/0219099 A1 | 7/2020 | Mohassel et al. |
| 2020/0252205 A1 | 8/2020 | Padmanabhan |
| 2020/0258166 A1 | 8/2020 | Cross et al. |
| 2020/0265031 A1 | 8/2020 | Greven |
| 2020/0268260 A1 | 8/2020 | Tran |
| 2020/0294033 A1 | 9/2020 | Wilson et al. |
| 2020/0320207 A1 | 10/2020 | Beno et al. |
| 2020/0322169 A1 | 10/2020 | Michaud et al. |
| 2020/0374137 A1 | 11/2020 | Godfrey |
| 2020/0374145 A1 | 11/2020 | Kau et al. |
| 2020/0389499 A1 | 12/2020 | Koval et al. |
| 2020/0403809 A1 | 12/2020 | Chan et al. |
| 2021/0034779 A1 | 2/2021 | Signorini et al. |
| 2021/0126797 A1 | 4/2021 | Peng |
| 2021/0136068 A1 | 5/2021 | Smeets et al. |
| 2021/0150205 A1 | 5/2021 | Snyder et al. |
| 2021/0158309 A1 | 5/2021 | McGinlay et al. |
| 2021/0174914 A1 | 6/2021 | Cano et al. |
| 2021/0182539 A1 | 6/2021 | Rassool |
| 2021/0208960 A1 | 7/2021 | Dande et al. |
| 2021/0218720 A1 | 7/2021 | Oberhauser et al. |
| 2021/0234672 A1 | 7/2021 | Zeng et al. |
| 2021/0264520 A1 | 8/2021 | Cummings |
| 2022/0051240 A1 | 2/2022 | Shamai et al. |
| 2022/0051314 A1 | 2/2022 | Enkhtaivan |
| 2022/0052988 A1 | 2/2022 | Gadnis et al. |
| 2022/0083936 A1 | 3/2022 | Balinsky et al. |
| 2022/0150077 A1 | 5/2022 | Kim |
| 2022/0179378 A1 | 6/2022 | Gourisetti et al. |
| 2022/0405750 A1 | 12/2022 | Fallah et al. |
| 2022/0407856 A1 | 12/2022 | Jawed |
| 2022/0414237 A1 | 12/2022 | Lally et al. |
| 2022/0417331 A1 | 12/2022 | Devine et al. |
| 2023/0006845 A1 | 1/2023 | Leedom, Jr. |

FOREIGN PATENT DOCUMENTS

| | | |
|---|---|---|
| WO | 2019086553 A1 | 5/2019 |
| WO | 2019090264 A1 | 5/2019 |
| WO | 2019090268 A1 | 5/2019 |
| WO | 2019207297 A1 | 10/2019 |
| WO | 2020006121 A1 | 1/2020 |
| WO | 2021127577 A1 | 6/2021 |

OTHER PUBLICATIONS

Newton, The battle inside Signal, The Verge, dated Jan. 25, 2021, 19 pages. Retrieved on Oct. 3, 2021. Retrieved from the internet. [URL: https://www.theverge.com/platform/amp/22249391/signal-app-abuse-messaging-employees-violence-misinformation ].

Object Management Group Issues Request for Information for Disposable Self-Sovereign Identity Standard, Object Management Group (OMG), dated Jan. 21, 2021, 3 pages. Retrieved on Oct. 3, 2021. Retrieved from the internet [URL: https://www.omg.org/news/releases/pr2021/01-21-21.htm ].

Otto et. al., Verifiable Credentials Use Cases, W3C Working Group, dated Sep. 24, 2019, 35 pages. Retrieved on Oct. 3, 2021. Retrieved from the internet [URL: https://www.w3.org/TR/vc-use-cases/ ].

Partnership for DSCSA Governance, PDG, 2021, 3 pages. Retrieved on Oct. 3, 2021. Retrieved from the internet [URL: https://dscsagovernance.org/ ].

PharmaCompass, Top 1000 Global Pharmaceutical Companies, LePro PharmaCompass OPC, dated Sep. 2020, 101 pages. Retrieved on Oct. 6, 2021. Retrieved from the internet [URL: https://www.pharmacompass.com/data-compilation/top-1000-global-pharmaceutical-companies ].

Ponemon, What's New in the 2019 Cost of a Data Breach Report, Security Intelligence, dated Jul. 23, 2019, 10 pages. Retrieved on Oct. 2, 2021. Retrieved from the internet [URL: https://securityintelligence.com/posts/whats-new-in-the-2019-cost-of-a-data-breach-report/ ].

Prabha, P. et al., Dec. 2020. Securing telecare medical information system with blockchain technology. In 2020 2nd International Conference on Advances in Computing, Communication Control and Networking (ICACCCN) (pp. 846-851). IEEE. (Year: 2020), in 6 pages.

Rahman et al., Blockchain Based Mobile Edge Computing Framework for Secure Therapy Applications, 2018, IEEE Special Section on Mobile Multimedia for Healthcare, vol. 6, p. 72469-72478 (Year: 2018).

(56) References Cited

OTHER PUBLICATIONS

Reed et. al., What are Decentralized Identifiers (DIDs)?, Evernym on Slideshare, dated Sep. 30, 2019, 29 pages. Retrieved on Oct. 3, 2021. Retrieved from the internet [URL: https://www.slideshare.net/Evernym/what-are-decentralized-identifiers-dids ].
Rose et. al., Zero Trust Architecture, NIST Special Publication 800-207, dated Aug. 2020, 59 pages. Retrieved on Oct. 6, 2021. Retrieved from the internet [URL: https://csrc.nist.gov/publications/detail/sp/800-207/final ].
Rossberg, WebAssembly Core Specification, W3C Working Group, W3C, dated Dec. 5, 2019, 164 pages. Retrieved on Oct. 5, 2021. Retrieved from the internet [URL: https://www.w3.org/TR/wasm-core-1/ ].
Searls, New Hope for Digital Identity, Linux Journal, dated Nov. 9, 2017, 7 pages. Retrieved on Oct. 4, 2021. Retrieved from the internet [URL: https://www.linuxjournal.com/content/new-hope-digital-identity ].
Shuaib et al., Blockchains for Secure Digitized Medicine, Journal of Personalized Medicine, dated Jul. 13, 2019, 9(3): 35, 21 pages. Retrieved on Oct. 2, 2021. Retrieved from the internet [URL: https://www.mdpi.com/2075-4426/9/3/35 ].
Sovrin Governance Framework Working Group, Sovrin Governance Framework V2, Sovrin Foundation, dated Dec. 4, 2019, 20 pages. Retrieved on Oct. 5, 2021. Retrieved from the internet [URL: https://sovrin.org/wp-content/uploads/Sovrin-Governance-Framework-V2-Master-Document-V2.pdf].
Sporny et al., Verifiable Credentials Data Model 1.0, W3C Working Group. dated Nov. 19, 2019, 122 pages. Retrieved on Oct. 3, 2021. Retrieved from the internet [URL: https://www.w3.org/TR/vc-data-model/ ].
StClair et. al., Blockchain, Interoperability, and Self-Sovereign Identity: Trust Me, It's My Data, Blockchain in Healthcare Today, dated Jan. 6, 2020, 3 pages. Retrieved on Oct. 3, 2021. Retrieved from the internet [URL: https://blockchainhealthcaretoday.com/index.php/journal/article/view/122/144 ].
Steel, Passwords Are Still a Problem According to the 2019 Verizon Data Breach Investigations Report, LastPass Blog, dated May 21, 2019, 4 pages. Retrieved on Oct. 2, 2021. Retrieved from the internet [URL: https://blog.lastpass.com/2019/05/passwords-still-problem-according-2019-verizon-data-breach-investigations-report/ ].
Temoshok et. al., Developing Trust Frameworks to Support Identity Federations, National Institute of Standards and Technology (NIST), dated Jan. 2018, 34 pages. Retrieved on Oct. 4, 2021. Retrieved from the internet [URL: http://dx.doi.org/10.6028/NIST.IR.8149].
Thayer, "Why Does Mozilla Maintain Our Own Root Certificate Store?", Mozilla Security Blog, dated Feb. 14, 2019, 3 pages. Retrieved on Oct. 3, 2021. Retrieved from the internet [URL: https://blog.mozilla.org/security/2019/02/14/why-does-mozilla-maintain-our-own-root-certificate-store/ ].
The Commons project, Unlocking the full potential of technology and data for the common good, 2019-2021, 5 pages. Retrieved on Oct. 3, 2021. Retrieved from the internet [URL: https://thecommonsproject.org/commonpass ].
Tobin et al., The Inevitable Rise of Self-Sovereign Identity, Sovrin Foundation Whitepaper, updated Mar. 28, 2017, 24 pages. Retrieved on Oct. 3, 2021. Retrieved from the internet [URL: https://sovrin.org/wp-content/uploads/2018/03/The-Inevitable-Rise-of-Self-Sovereign-Identity.pdf ].
U.S. Appl. No. 17/492,488, filed Oct. 1, 2021, Pending.
U.S. Appl. No. 17/492,488—Office Action dated Aug. 17, 2022, 25 pages.
U.S. Appl. No. 17/982,509, filed Nov. 7, 2022, Pending.
U.S. Appl. No. 17/982,513, filed Nov. 7, 2022, Pending.
U.S. Appl. No. 17/982,518, filed Nov. 7, 2022, Pending.
U.S. Department of Health and Human Services Food and Drug Administration, Identifying Trading Partners Under the Drug Supply Chain Security Act: Guidance for Industry—Draft Guidance, Aug. 2017, 18 pages. Retrieved on Oct. 1, 2021. Retrieved from the internet [URL: https://www.fda.gov/files/drugs/published/Identifying-Trading-Partners-Under-the-Drug-Supply-Chain-Security-Act-Guidance-for-Industry.pdf].
U.S. Department of Health and Human Services Food and Drug Administration, Verification Systems Under the Frug Supply Chain Security Act for Certain Prescription Drugs, Guidance for Industry, Draft Guidance, dated Oct. 2018, 14 pages. Retrieved on Oct. 2, 2021. Retrieved from the internet [URL: https://www.fda.gov/media/117950/download ].
U.S. Department of Health and Human Services Food and Drug Administration, Wholesale Distributor Verification Requirement for Saleable Returned Drug Product and Dispenser Verification Requirements When Investigating a Suspect or Illegitimate Product—Compliance Policies, Guidance for Industry, dated Oct. 2020, 10 pages. Retrieved on Oct. 2, 2021. Retrieved from the internet [URL: https://www.fda.gov/media/131005/download ].
U.S. Department of Health and Human Services, Food and Drug Administration, Identifying Trading Partners Under the Drug Supply Chain Security Act, Guidance for Industry, dated Aug. 2017, 18 pages. Retrieved on Oct. 3, 2021. Retrieved from the internet [URL: https://www.fda.gov/files/drugs/published/Identifying-Trading-Partners-Under-the-Drug-Supply-Chain-Security-Act-Guidance-for-Industry.pdf].
U.S. Food and Drug Administration, Drug Supply Chain Security Act Law and Policies, U.S. Department of Health and Human Services Food and Drug Administration, updated Oct. 23, 2020, 6 pages. Retrieved on Oct. 1, 2021. Retrieved from the internet [URL: https://www.fda.gov/drugs/drug-supply-chain-security-act-dscsa/drug-supply-chain-security-act-law-and-policies].
UCLA Health, "UCLA-LedgerDomain: DSCSA Solution through Blockchain Technology: Druck Tracking, Tracing and Verification at the Last Mile of the Pharmaceutical Supply Cain with BRUINchain", PDG FDA Pilot Program Round Robin, Jul. 2020, in 160 pages.
Untitled code sample, W3C Working Group, W3C, dated 2018, 7 pages. Retrieved on Oct. 6, 2021. Retrieved from the internet [URL: https://www.w3.org/2018/credentials/v1 ].
Web Assembly, Mozilla Developer Network (MDN), dated 2021, 31 pages. Retrieved on Oct. 5, 2021. Retrieved from the internet [URL: https://developer.mozilla.org/en-US/docs/WebAssembly ].
What are Smart Health Cards?, Smart Health Cards Framework, 2021, 4 pages. Retrieved on Oct. 3, 2021. Retrieved from the internet [URL: https://smarthealth.cards/ ].
XATP Working Group, Framework for extended ATP Authentication, Enhanced Verification and Saleable Returns Documentation, LedgerDomain, dated Dec. 17, 2020, 25 pages. Retrieved on Oct. 1, 2021. Retrieved from the internet [URL: https://www.xatp.org/publications ].
Young, Verifiable Credentials Flavors Explained, COVID-19 Credentials Initiative, dated Feb. 2021, 21 pages. Retrieved on Oct. 3, 2021. Retrieved from the internet [URL: https://www.lfph.io/wp-content/uploads/2021/02/Verifiable-Credentials-Flavors-Explained.pdf].
Abid et al., Block-Chain Security Advancement in Medical Sector for sharing Medical Records, 2019 International Conference on Innovative Computing (ICIC) (Year: 2019).
Androulaki et al., Hyperledger Fabric: A distributed operating system for permissioned blockchains, Proceedings for EuroSys 2018 Conference, revised Apr. 17, 2018, 15 pages. Retrieved on Oct. 2, 2021. Retrieved from the internet [URL: https://arxiv.org/abs/1801.10228 ].
Ashkar et. al., Evaluation of Decentralized Verifiable Credentials to Authenticate Authorized Trading Partners and Verify Drug Provenance, Blockchain for Healthcare Today, dated Mar. 11, 2021, 14 pages. Retrieved on Oct. 3, 2021. Retrieved from the internet [URL: https://blockchainhealthcaretoday.com/index.php/journal/article/view/168 ].
Bogdanov, Pseudorandom Functions: Three Decades Later, dated 2017, 72 pages. Retrieved on Oct. 6, 2021. Retrieved from the internet [URL: https://eprint.iacr.org/2017/652.pdf].
Bossert, I Was the Homeland Security Adviser to Trump. We're Being Hacked., The New York Times, dated Dec. 16, 2020, 3 pages.

(56) References Cited

OTHER PUBLICATIONS

Retrieved on Oct. 3, 2021. Retrieved from the internet [URL: https://www.nytimes.com/2020/12/16/opinion/fireeye-solarwinds-russia-hack.html ].

Bourque, Ditching passwords and increasing e-commerce conversion rates by 54%, CIO, dated May 1, 2017, 4 pages. Retrieved on Oct. 2, 2021. Retrieved from the internet [URL: https://www.cio.com/article/3193206/ditching-passwords-and-increasing-ecommerce-conversion-rates-by-54.html ].

Brook, "What's the Cost of a Data Breach in 2019?", Data Insider—Digital Guardian, dated Dec. 1, 2020, 8 pages. Retrieved on Oct. 2, 2021. Retrieved from the internet [URL: https://digitalguardian.com/blog/whats-cost-data-breach-2019 ].

Callahan et al., Six Principles for Self-Sovereign Biometrics, Web of Trust Info., GitHub, dated Oct. 6, 2019, 7 pages. Retrieved on Oct. 5, 2021. Retrieved from the internet [URL: https://github.com/WebOfTrustInfo/rwot6-santabarbara/blob/master/draft-documents/Biometrics.md].

Callahan, Council Post: Know Your Customer (KYC) Will Be a Great Thing When It Works, Forbes, dated Jul. 10, 2018, 8 pages. Retrieved on Oct. 1, 2021. Retrieved from [URL: https://www.forbes.com/sites/forbestechcouncil/2018/07/10/know-your-customer-kyc-will-be-a-great-thing-when-it-works/?sh=722a21178dbb ].

Chadwick et al., Verifiable Credentials Data Model 1.0: Expressing verifiable information on the Web, World Wide Web Consortium (W3C), dated Nov. 19, 2019, 68 pages. Retrieved on Oct. 1, 2021. Retrieved from the Internet [URL: https://www.w3.org/TR/vc-data-model/ ].

Chien et al., The Last Mile: DSCSA Solution Through Blockchain Technology: Drug Tracking, Tracing and Verification at the Last Mile of the Pharmaceutical Supply Chain with BRUINchain, Blockchain in Healthcare Today, dated Mar. 12, 2020, 28 pages. Retrieved on Oct. 2, 2021. Retrieved from the internet [URL: https://blockchainhealthcaretoday.com/index.php/journal/article/view/134 ].

COVID-19 Credentials Initiative, Hello World from the COVID-19 Credentials Initiative, dated Jun. 25, 2020, 3 pages. Retrieved on Oct. 3, 2021. Retrieved from the internet [URL: https://cci-2020.medium.com/hello-world-from-the-covid-19-credentials-initiative-6d45534c4b3a ].

DIF—Decentralized Identity Foundation, Homepage, dated 2021, 8 pages. Retrieved on Oct. 6, 2021. Retrieved from the internet [URL: https://identity.foundation/ ].

Dodds, Follow Your Nose, Linked Data Patterns, dated May 31, 2012, 2 pages. Retrieved on Oct. 3, 2021. Retrieved from the internet [URL: https://patterns.dataincubator.org/book/follow-your-nose.html ].

Drug Supply Chain Security Act (DSCSA), Food and Drug Administration (FDA), retrieved on Oct. 1, 2021, 3 pages. Retrieved from [URL: https://www.fda.gov/drugs/drug-supply-chain-integrity/drug-supply-chain-security-act-dscsa ].

DSCSA Pilot Project Program, Food and Drug Administration (FDA), updated May 22, 2019, 4 pages. Retrieved on Oct. 2, 2021. Retrieved from the internet [URL: https://www.fda.gov/drugs/drug-supply-chain-security-act-dscsa/dscsa-pilot-project-program ].

Entities, Spherity, 3 pages. Retrieved on Oct. 3, 2021. Retrieved from the internet [URL: https://docs.spherity.com/spherity-api/verifiable-credentials-api/entities ].

FDA's Technology Modernization Action Plan (TMAP), Food and Drug Administration (FDA), dated Sep. 18, 2019, 10 pages. Retrieved on Oct. 3, 2021. Retrieved from the internet [URL: https://www.fda.gov/media/130883/download].

Federal Trade Commission, Federal Law Requires All Businesses to Truncate Credit Card Information on Receipts, Federal Trade Commission (FTC), dated May 2007, 3 pages. Retrieved on Oct. 2, 2021. Retrieved from the internet [URL: https://www.ftc.gov/tips-advice/business-center/guidance/slip-showing-federal-law-requires-all-businesses-truncate ].

Freisleben, VRS Updates: Past, Present and Future, dated Dec. 12, 2018, Healthcare Distribution Alliance (HDA), 6 pages. Retrieved on Oct. 1, 2021. Retrieved from the internet [URL: https://www.hda.org/news/hda-blog/2018/12/07/14/44/2018-12-12-vrs-update-past-present-future ].

Gabay, Federal Controlled Substances Act: Ordering and Recordkeeping, Hospital Pharmacy, dated Dec. 9, 2013, 3 pages. Retrieved on Oct. 2, 2021. Retrieved from the internet [URL: https://www.ncbi.nlm.nih.gov/pmc/articles/PMC3875106/ ].

General Meeting Agenda—Healthcare SIG, Hyperledger Foundation, updated Feb. 17, 2021, 2 pages. Retrieved on Oct. 3, 2021. Retrieved from the internet [URL: https://wiki.hyperledger.org/display/HCSIG/2021.02.17+General+Meeting+Agenda ].

Google Protocol Buffers—Google's data interchange format, Github, dated 2008, 6 pages. Retrieved on Oct. 3, 2021. Retrieved from the internet [URL: https://github.com/protocolbuffers/protobuf].

Grassi et al., Digital Identity Guidelines, NIST Special Publication 800-63-3, dated Jun. 2017, 75 pages. Retrieved on Oct. 6, 2021 Retrieved from the internet [URL: https://doi.org/10.6028/NIST.SP.800-63-3 ].

Grassi et al., Digital Identity Guidelines: Authentication and Lifecycle Management, NIST Special Publication 800-63B, dated Jun. 2017, 79 pages. Retrieved on Oct. 6, 2021. Retrieved from the internet [URL: https://doi.org/10.6028/NIST.SP.800-63b ].

Grassi et al., Digital Identity Guidelines: Federation and Assertions, NIST Special Publication 800-63C, dated Jun. 2017, 49 pages. Retrieved on Oct. 6, 2021. Retrieved from the internet [URL: https://doi.org/10.6028/NIST.SP.800-63c ].

Grassi et al., NIST Special Publication 800-63C, Digital Identity Guidelines—Federation and Assertions, retrieved on Oct. 1, 2021, 48 pages. Retrieved from [ URL: https://pages.nist.gov/800-63-3/sp800-63c.html ].

GS1 Healthcare U.S. Standard 1.1—Applying the GS1 Lightweight Messaging Standard for DSCSA Verification of Returned Product Identifiers, dated Mar. 31, 2020, 60 pages. Retrieved on Oct. 1, 2021. Retrieved from the Internet [URL: https://www.gs1us.org/DesktopModules/Bring2mind/DMX/Download.aspx?Command=Core_Download&EntryId=1897&language=en-US&PortalId=0&TabId=134].

GS1 Healthcare U.S., Assessing Current Implementation of DSCSA Serialization Requirements, GS1 US, dated 2018, 6 pages. Retrieved on Oct. 2, 2021. Retrieved from the internet [URL: https://www.gs1us.org/DesktopModules/Bring2mind/DMX/Download.aspx?Command=Core_Download&EntryId=1210&language=en-US&PortalId=0&TabId=134 ].

GS1 Healthcare U.S., GS1 Lightweight Messaging Standard for Verification of Product Identifiers, dated Dec. 2018, 30 pages. Retrieved on Oct. 2, 2021. Retrieved from the internet [URL: https://www.gs1.org/docs/epc/GS1_Lightweight_Verification_Messaging_Standard.pdf].

GS1 Healthcare U.S., Standard 1.2, Applying GS1 Standards for DSCSA and Traceability, dated Nov. 7, 2016, 126 pages. Retrieved on Oct. 2, 2021. Retrieved from the internet [URL: https://www.gs1us.org/DesktopModules/Bring2mind/DMX/Download.aspx?Command=Core_Download&EntryId=749&language=en-US&PortalId=0&TabId=134 ].

GS1 Standards Resources for DSCSA Implementation Support, GS1 US, dated Feb. 22, 2021, 7 pages. Retrieved on Oct. 3, 2021. Retrieved from the internet [URL: https://www.gs1us.org/industries/healthcare/standards-in-use/pharmaceutical/dscsa-resources ].

GS1 U.S., "DSCSA Pilot Project readiness results: How the industry is preparing for DSCSA Interoperability", PDG FDA Pilot Program Round—Robin Webinar Series, The Global Language of Business (2020) slides 15-29. Retrieved on Oct. 2, 2021 from the internet [URL: https://dscsagovernance.org/wp-content/uploads/2020/08/Attachment-A-Presentations.pdf], in 15 pages.

Hammi, M.T. et al., Apr. 2018. "BCTrust: A decentralized authentication blockchain-based mechanism". In 2018 IEEE wireless communications and networking conference (WCNC) (pp. 1-6). IEEE. (Year: 2018), in 6 pages.

Hardman, Verifiable Data Registry (Image), Wikipedia, dated Nov. 5, 2019, 1 page. Retrieved on Oct. 6, 2021. Retrieved from the internet [URL: https://en.wikipedia.org/wiki/Verifiable_credentials#/media/File:VC_triangle_of_Trust.svg ].

(56) References Cited

OTHER PUBLICATIONS

HDA Saleable Returns Pilot Study Identifies Two Recommendations to Meet 2019 DSCSA Requirements, Healthcare Distribution Alliance (HDA), dated Nov. 10, 2016, 5 pages. Retrieved on Oct. 3, 2021. Retrieved from the Internet [URL: https://www.hda.org/news/2016-11-10-hda-pilot-results-revealed ].

Heath, SolarWinds hack was 'largest and most sophisticated attack' ever—Microsoft president, Financial Post, dated Feb. 14, 2021, 3 pages. Retrieved on Oct. 3, 2021. Retrieved from the internet [URL: https://financialpost.com/pmn/business-pmn/solarwinds-hack-was-largest-and-most-sophisticated-attack-ever-microsoft-president].

Housley et. al., Trust Anchor Format, Internet Engineering Task Force (IETF), dated Jun. 2021, 14 pages. Retrieved on Oct. 3, 2021. Retrieved from the internet [URL: https://datatracker.ietf.org/doc/html/rfc5914 ].

How to share an OpenPGP public key easily in three steps, Mailfence, dated Jul. 11, 2017, 14 pages. Retrieved on Aug. 13, 2021. Retrieved from the internet [URL: https://blog.mailfence.com/openpgp-public-key/ ].

Hyperledger, Ursa, Github, updated 2021, 7 pages. Retrieved on Oct. 3, 2021. Retrieved from the internet [URL: https://github.com/hyperledger/ursa ].

Identity-concept.svg, Wikimedia Commons, 3 pages. Retrieved on Oct. 6, 2021. Retrieved from the internet [URL: https://commons.wikimedia.org/wiki/File:Identity-concept.svg].

Jurgens, Industry-wide DSCSA Compliance Pilot Successfully Completed, Spherity, dated Dec. 17, 2020, 15 pages. Retrieved on Oct. 1, 2021. Retrieved from the internet [URL: https://medium.com/spherity/industry-wide-dscsa-compliance-pilot-successfully-completed-d7223a0f2c92].

Kaptjin et. al., X.509 DID method, WebOfTrustInfo, GitHub, dated Aug. 12, 2019, 6 pages. Retrieved on Oct. 5, 2021. Retrieved from the internet [URL: https://github.com/WebOfTrustInfo/rwot9-prague/blob/master/topics-and-advance-readings/X.509-DID-Method.md ].

Keen et al., Forecasts Worldwide Information Security Spending to Exceed $124 Billion in 2019, Gartner, dated Aug. 15, 2018, 5 pages. Retrieved on Oct. 2, 2021. Retrieved from the internet [URL: https://www.gartner.com/en/newsroom/press-releases/2018-08-15-gartner-forecasts-worldwide-information-security-spending-to-exceed-124-billion-in-2019 ].

Krebs, At Least 30,000 U.S. Organizations Newly Hacked via Holes in Microsoft's Email, Krebson Security, dated Mar. 5, 2021, 6 pages. Retrieved on Oct. 3, 2021. Retrieved from the internet. [URL: https://krebsonsecurity.com/2021/03/at-least-30000-u-s-organizations-newly-hacked-via-holes-in-microsofts-email-software/ ].

Lodder et al., Sovrin DID Method Specification, Sovrin Foundation, dated Aug. 20, 2021, 16 pages. Retrieved on Oct. 3, 2021. Retrieved from the internet [URL: https://sovrin-foundation.github.io/sovrin/spec/did-method-spec-template.html ].

Looker et. al., BBS+ Signatures 2020 Draft Community Group Report, W3C Community Group, dated Jun. 13, 2021, 31 pages. Retrieved on Oct. 3, 2021. Retrieved from the internet [URL: https://w3c-ccg.github.io/ldp-bbs2020/ ].

Lu, "How Much are Password Resets Costing Your Company?", Okta, dated Aug. 20, 2019, 2 pages. Retrieved on Oct. 2, 2021. Retrieved from the internet [URL: https://www.okta.com/blog/2019/08/how-much-are-password-resets-costing-your-company/ ].

Makaay et. al., Frameworks for Identity Systems, Open Identity Exchange (OIX), dated Jun. 2017, 18 pages. Retrieved on Oct. 5, 2021. Retrieved from the internet [URL: https://connectis.com/wp-content/uploads/2018/05/OIX-White-Paper_Trust-Frameworks-for-Identity-Systems_Final.pdf].

Matney, Apple's global active install base of iPhones surpassed 900 million this quarter, TechCrunch, dated Jan. 29, 2019, 2 pages. Retrieved on Oct. 2, 2021. Retrieved from the internet [URL: https://techcrunch.com/2019/01/29/apples-global-active-install-base-of-iphones-surpassed-900-million-this-quarter/].

U.S. Appl. No. 17/063,585, filed Oct. 5, 2020, U.S. Pat. No. 11,245,691, Feb. 8, 2022, Granted.
U.S. Appl. No. 17/063,605, filed Oct. 5, 2020, U.S. Pat. No. 11,081,219, Aug. 3, 2021, Granted.
U.S. Appl. No. 17/384,585, filed Jul. 23, 2021, U.S. Pat. No. 11,829,510, Nov. 28, 2023, Granted.
U.S. Appl. No. 17/665,471, filed Feb. 4, 2022, U.S. Pat. No. 11,848,758, Dec. 19, 2023, Granted.
U.S. Appl. No. 18/520,455, filed Nov. 27, 2023, 20240104243, Mar. 28, 2024, Published.
U.S. Appl. No. 18/544,337, filed Dec. 18, 2023, Pending.
U.S. Appl. No. 17/492,488, filed Oct. 1, 2021, U.S. Pat. No. 11,769,577, Sep. 26, 2023, Granted.
U.S. Appl. No. 18/372,029, filed Sep. 22, 2023, Pending.
U.S. Appl. No. 18/372,037, filed Sep. 22, 2023, Pending.
U.S. Appl. No. 17/982,518, filed Nov. 7, 2022, U.S. Pat. No. 11,848,754, Dec. 19, 2023, Granted.
U.S. Appl. No. 18/544,356, filed Dec. 18, 2023, Pending.
U.S. Appl. No. 17/982,509, filed Nov. 7, 2022, U.S. Pat. No. 11,736,290, Aug. 22, 2023, Granted.
U.S. Appl. No. 18/236,361, filed Aug. 22, 2023, Pending.
U.S. Appl. No. 17/982,513, filed Nov. 7, 2022, U.S. Pat. No. 11,741,216, Aug. 29, 2023, Granted.
U.S. Appl. No. 18/239,088, filed Aug. 28, 2023, Pending.
U.S. Appl. No. 63/398,455, filed Aug. 16, 2022, Expired.
U.S. Appl. No. 18/234,293, filed Aug. 15, 2023, Allowed.

* cited by examiner

1. Credential Provisioning/Administration 300

2. Credential Encryption 310

3. Encrypted Credential Upload 320

4. Recipient Private Key Transmission 330

5. Private Key Removal 340

- Remove Administrator's private key from CAL
- Remove Recipient private key from CAL
- Remove encrypted credential from CAL

1. Recipient Private Key Exchange 350

2. Recipient Public Key Generation 360

3. Credential Retrieval 370

4. Credential Decryption 380

5. Recipient Authentication 390

Training Neural Network

1000

Back Propagation

Adjust Weights

Training Input Data
1002

Neural Network (with weights between neurons)
900

Output Estimate

Compare

Error
1006

Ground Truth
1026

RECIPIENT CREDENTIALING LEVERAGING PRIVATE KEYS ON KEYSTORES READ BY PROVISIONED DEVICES

PRIORITY

This application is a continuation of U.S. patent application Ser. No. 17/982,507, titled "RECIPIENT CREDENTIALING LEVERAGING PRIVATE KEYS ON KEYSTORES READ BY PROVISIONED DEVICESP", filed Nov. 7, 2022, which is incorporated herein by reference in its entirety for all purposes.

RELATED APPLICATION

This application is related to the following application which is incorporated by reference herein for all purposes:

U.S. Nonprovisional patent application Ser. No. 17/492,488, titled "Decentralized Identity Authentication Framework for Distributed Data," filed Oct. 1, 2021.

FIELD OF INVENTION

The technology disclosed relates generally to decentralized identity authentication and management in a network of computers and corresponding data processing methods and products implementing secure authentication of users and user credential claims for access to a distributed, permissioned data structure shareable among disparate enterprises. In particular, the technology disclosed relates to using security software technology to implement authentication and credentialing by a trusted party of a non-credentialed user, enabling controlled access to secure permissioned blockchain data distributed among disparate enterprise actors.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Contemporary mobile devices (e.g., smartphones, tablet computers, and wearable devices such as smartwatches, and integrated circuit cards) have incorporated significant advancements in sensing technologies such as camera quality, geolocation sensing, and biometric authentication. Sensing technologies within recent generations of mobile devices are frequently comparable in functionality to those of industry-standard devices used by an enterprise (such as a business, company, firm, venture, partnership, and many other collaborative entities) in operations ranging from supply chain management and employee training to point-of-sale transactions. The use of mobile devices for business operations is advantageous due to the familiarity of these devices to workers of diverse backgrounds and skill levels.

With great power comes great responsibility; as well as great potential for chaos. Workers are known for sharing passwords without authorization, and the problem compounds when devices can be shared with other workers. Further, the rise of the "gig" economy has created a new segment of the workforce—those with a "loose affiliation" to an enterprise or multiple, potentially competing, enterprises.

An opportunity arises for improving the provisioning of devices for use in the workplace, and controlling the issuance of user credentials granted to users of these provisioned devices.

BRIEF DESCRIPTION OF DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 10 depicts a block diagram of training a neural network in accordance with one implementation of the technology disclosed.

DETAILED DESCRIPTION

Figure 1A:
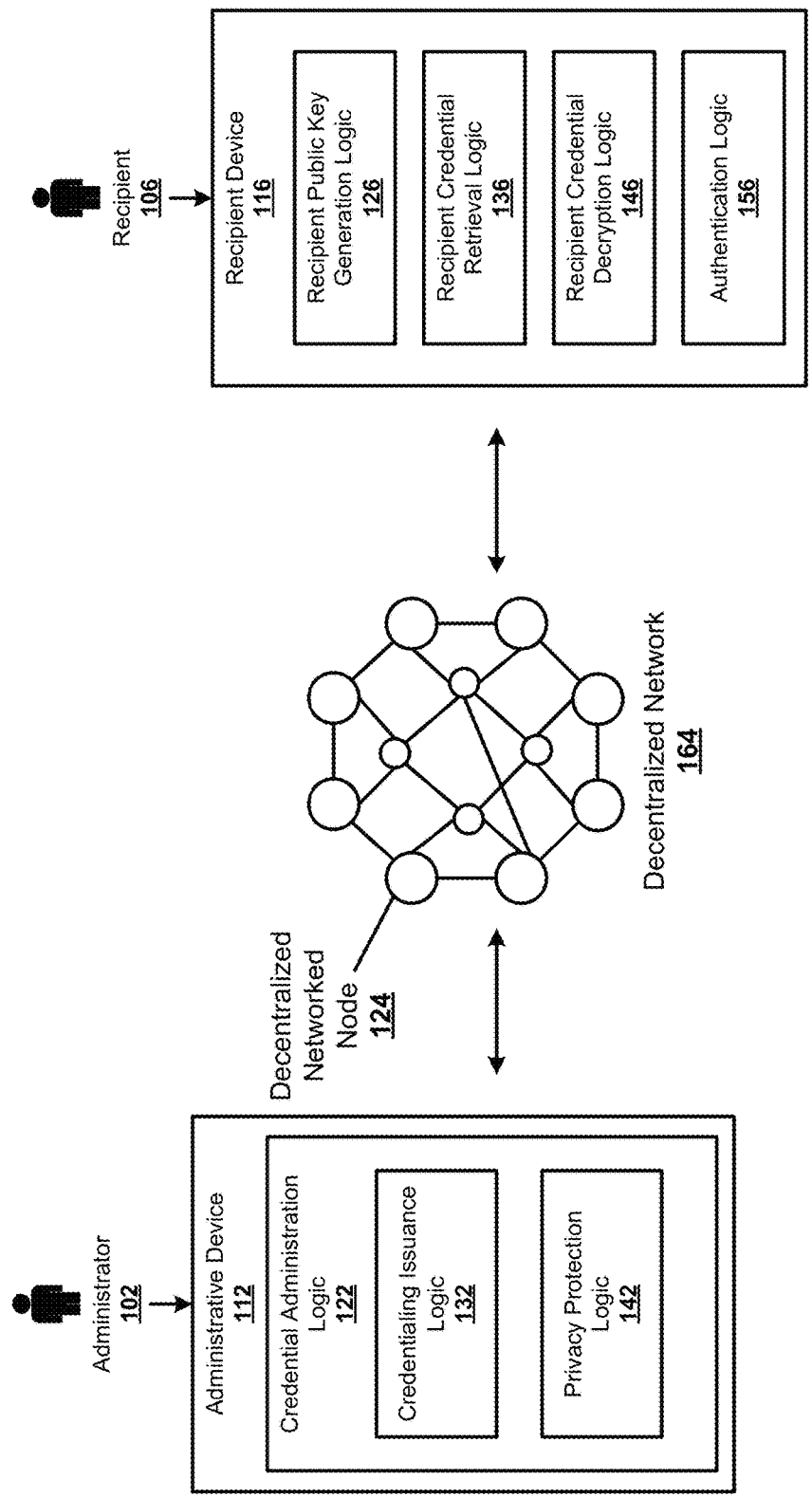
FIG. 1A shows an architectural level diagram of a system for user credentialing leveraging private keys on single-tenant provisioned devices.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

INTRODUCTION

In identity and access management (IAM) systems, identity can be established through workflows encompassing application, review, and provisioning. Enterprises may provision administrators with the ability to define user roles and access privileges, but this approach can create significant bottlenecks and review overhead. In many cases, a centralized IAM system may be insufficiently flexible or efficient to accommodate the needs of individuals within an enterprise. An administrator may wish to give an individual user credentials so that the individual can receive temporary or limited access to certain privileges without waiting for a third-person administrator to approve or sharing all of their user information and access with the individual (or with a third-party administrator). While the individual may be acting on the administrator's behalf, the actions must be logged and tracked separately with a high degree of certainty which person performed each particular action.

Many centralized systems (e.g., cloud-based file storage solutions) accommodate this requirement by allowing users to invite other users to access shared resources. However, this still requires that credentialing and access are centrally managed, and often leverages email-based communications, particularly when the two users are not part of the same organization. This creates a point of failure that is highly vulnerable to compromise by bad actors.

Moreover, mobile devices have also made possible the introduction of new cryptographic capabilities that enable users to retain their own private keys locally rather than in cloud storage. In contrast to retaining private keys in cloud-based repositories, locally-sequestered private keys prevent a single party from having comprehensive access to an enterprise's identity and access management (IAM) framework. Hence, in the event that enterprise servers are breached, attackers are unable to impersonate existing users, as they would not have access to any user private keys. Provisioning of so-called self-sovereign credentials and delegation of access privileges leveraging private keys on uniquely identifiable devices provides efficacious IAM solutions for a variety of enterprises such as healthcare organizations, financial institutions, and non-profit organizations. For example, in the pharmaceutical supply chain, access management and auditability requirements demand that each interaction with privileged systems must be traceable to a single individual user.

The technology disclosed comprises generating identity credentials involving two-factor authentication consisting of an application running on a uniquely identifiable device capable of accommodating a single user or a plurality of users, combined with uniquely identifiable keystores storing a user private key associated with respective individual users.

The disclosed system comprises an implementation for leveraging self-sovereign credentials held on mobile devices to provision credentials that empower one party ("recipient" or "user", used synonymously herein) to obtain credentialed access to information and resources on behalf of another party ("sender" or "administrator", used synonymously herein), without either party exposing private key information to each other or to the cloud. The sender is able to revoke user credentials at any time. The recipient can, under the terms of the smart contract, in some situations delegate some of their access privileges to a second recipient. Revocation of a recipient's authorization can in turn trigger revocation of any access authorities that recipient delegated to other recipients. Further, some delegations of authority can be evanescent, e.g., limited in duration by a passage of time or occurrence or absence of an event, after which the authority is no longer delegated. Parties are able to leverage commodity hardware to automatically mutually authenticate their credentials and access available relevant options and workflows.

In some implementations, self-sovereign credentials are sequestered locally to a uniquely identifiable user device, such as a smart phone or identity badge (e.g., radio frequency identification (RFID), near-field communication (NFC) tags, integrated circuit cards, Bluetooth-enabled mobile devices, and so on). Providing users with self-sovereign credentials enables the sharing of access to data in a way that does not require the use of insecure sharing mechanisms as a sole means of authentication (e.g., email or SMS), does not require centralized credential management, and enables the sender and recipient of access credentials to validate each other's identities and share permissioned access to sensitive systems and data with a high degree of confidence. Users on a common shared directory can share and delegate access without exposing private key information; such directories might be very large and encompass entire communities comprising multiple organizations. For users who are not on a common shared directory, the invention leverages widely available and commonly used commodity hardware combined with physical affordances to rapidly enable decentralized access delegation and secure communications.

Cloud-based user authentication often requires that plaintext passwords be exposed at time of login; while these passwords are hashed and salted, there are cases where the memory is not erased and therefore passwords remain vulnerable to bad actors. In the disclosed system, a private key may remain locally-stored on a single-tenant user device, or stored on a keystore read by a multi-tenant user device. In the multi-tenant user device use case, the private key only has a short, finite tenure on the multi-tenant user device after which all related sensitive material is wiped. In both the single-tenant and multi-tenant user device scenarios, private keys never reach the server; thus, if the server were breached, an attacker would be unable to impersonate an existing user. In the event of a compromise, the issuing party can issue revocations for a particular set of identity credentials without wiping out the entire public key registry. As a result, the likelihood of a major data breach is substantially decreased, avoiding the associated potential consequences ranging from clearing a severely compromised registry to undergoing years of cleanup and reconciliation.

Architecture

FIG. 1A shows an architectural level diagram of a system 100A for user credentialing leveraging private keys on single-tenant provisioned devices. Because FIG. 1A is an architectural diagram, certain details are intentionally omitted to improve clarity of the description. The discussion of FIG. 1A is organized as follows. First, the elements of the figure are described, followed by their interconnections. Then, the use of the elements in the system are described in greater detail.

System 100A includes an administrative device 112 accessible by an administrator 102, a decentralized network 164, and a recipient device 116 accessible by a recipient 106. Administrative device 112 comprises a credential administration logic 122, where credential administration logic 122 further comprises a credential issuance logic 132 and a privacy protection logic 142. Recipient device 116 comprises a recipient public key generation logic 126, a recipient credential retrieval logic 136, a recipient credential decryption logic 146, and an authentication logic 156.

Administrative device 112 and recipient device 116 within system 100A interact with a decentralized network 164, wherein decentralized network 164 comprises a plurality of decentralized network nodes such as decentralized networked node 124. In some implementations of the technology disclosed, decentralized network 164 is a private permissioned blockchain data structure. In other implementations, decentralized network 164 is an alternative decentralized personal ledger data structure.

In the interconnection of the elements of system 100A, communication may occur over one or more cloud servers. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi, and WiMAX.

System 100A is configured to provision user credentials for access to a decentralized networked node 124 within decentralized network 164, to which access has been limited to users authorized by decentralized networked node 124.

Administrator 102 uses credential administration logic 122, running on administrative device 112, to receive from a recipient 106 seeking credentialling electronic presentation of one or more instances of electronic evidence personally identifying a recipient 106 or supporting any credentialling being sought and a keystore to hold access to any credentialling issued.

Components of credential administration logic 122 are now discussed in further detail. Credentialing issuance logic 132 is configured to issue a recipient credential being sought by generating a recipient private key and recipient public key upon receipt of approval of the electronic evidence, forwarding the recipient's user credential being sought comprising the recipient public key to one of a set of decentralized networked nodes 124 that share a decentralized network 164, expunging any copies of the user private key; and (iii) issuing to the keystore the user private key; thereby credentialling the user to exchange secure messages with a decentralized networked node 124 within decentralized network 164. The recipient private key is stored in a keystore of recipient 106, wherein the keystore may be recipient device 116 or an additional keystore (e.g., badge) read by recipient device 116. In some implementations, encryption and deployment of the user credential are implemented using a decentralized identity communication (DIDComm) messaging protocol, such that the DIDComm messaging protocol uses the administrative private key as a sender and the recipient public key as a recipient. The encrypted user credential is generated as a shared secret by executing an Elliptic Curve Diffie-Hellman (ECDH) key exchange protocol. The encrypted user credential is indexed on a key-value store, wherein the key-value store is stored on decentralized network 164. Privacy protection logic 142 is configured to expunge any evidence personally identifying the user or supporting any credentialling being sought that is evanescent according to a limit of duration.

Recipient public key generation logic 126, running on recipient device 116, generates the recipient public key based on the recipient private key using an elliptic curve cryptography function. In some implementations of the disclosed system, the recipient private key is stored locally on the recipient device 116. In other implementations, the recipient private key is stored locally on a keystore read by the recipient device 116. Recipient credential retrieval logic 136, also running on recipient device 116, uses the recipient public key generated by recipient public key generation logic 126 to query the key-value store for the encrypted user credential and receive the encrypted user credential from the key-value store, using DIDComm messaging protocol and ECDH key exchange. Recipient credential decryption logic 146, running on recipient device 116, decrypts the encrypted user credential using the recipient private key, generating a decrypted user credential. Authentication logic 156, running on recipient device 116, authenticates the recipient using the decrypted user credential when the recipient seeks authentication to a particular application running on the recipient device, such that the particular application accesses a network node to which access has been limited to users authorized by decentralized network node 124.

Further continuing with the description of the system 100A, components of FIG. 1A are implemented by software running on varying types of computing devices. Example devices are a workstation, a server, a computing cluster, a blade server, and a server farm, or any other data processing system or computing device. The engine can be communicably coupled to the databases via a different network connection.

While system 100A is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

In contrast to system 100A, a system 100B is now described comprising a multi-tenant user device called a workgroup device 128. A plurality of users may all interact with workgroup device 128, wherein each particular user is authenticated using a recipient keystore read by workgroup device 128.

Figure 1B:
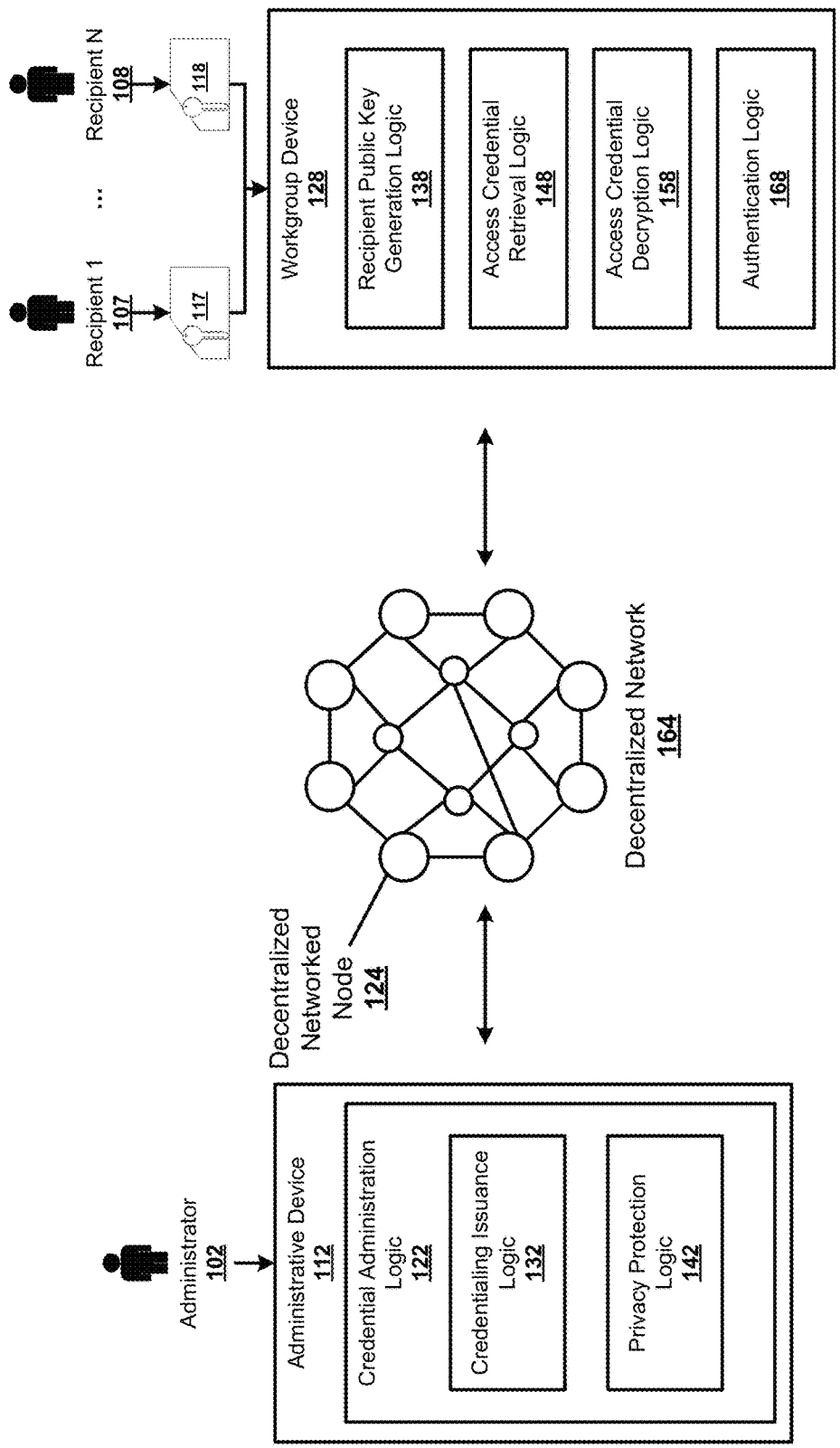
FIG. 1B shows an architectural level diagram of a system for user credentialing leveraging private keys on multi-tenant provisioned devices.

FIG. 1B shows an architectural level diagram of a system 100B for user credentialing leveraging private keys on keystores read by multi-tenant provisioned devices. Because FIG. 1B is an architectural diagram, certain details are intentionally omitted to improve clarity of the description. The discussion of FIG. 1B is organized as follows. First, the elements of the figure are described, followed by their interconnections. Then, the use of the elements in the system are described in greater detail.

System 100B includes an administrative device 112 accessible by an administrator 102, a decentralized network 164, a credentialing logic 104, and a workgroup device 128 accessible by a plurality of recipients including a first recipient 107 through an $n^t$ recipient 108. Administrative device 112 comprises a credential administration logic 122, where credential administration logic 122 further comprises a credential issuance logic 132 and a privacy protection logic 142. Recipient device 116 comprises a recipient public key generation logic 126, a recipient credential retrieval logic 136, a recipient credential decryption logic 146, and an authentication logic 156.

The unit cost and ongoing maintenance of mobile devices provisioned to users within an enterprise often makes their use prohibitively expensive and difficult to manage over time. In many cases, a multi-tenant device provides an economical and readily supported solution. Unfortunately, this introduces an additional set of security complications. For example, in the pharmaceutical supply chain, information access management and auditability requirements demand that each interaction on such a system must be traceable to a single individual user. Many methods exist to authenticate user identity on a multi-tenant device including passwords, passcodes, facial recognition, fingerprint recognition, etc. In these cases, the credentialed user is required to undergo their own set-up process, and/or consent to the disclosure and use of sensitive biometric information in an era of increasing concern related to biometric data privacy. Passcodes are highly vulnerable due to their brevity, and longer, more complex passwords can be difficult to remember, both requiring regular rotations. Facial recognition has a 1:1,000,000 failure rate; while this may be acceptable for single-tenant devices, it is less acceptable for a device that performs regular re-authentication of a plurality of users. In contrast, a 256-bit key is difficult to attack and can be committed to a variety of keystores.

Recipients 1 107 through N 108 access workgroup device 128 via respective keystores 117 through 118. Keystore 117 stores the user private key of recipient 1 107, such that workgroup device 128 reads the keystore 117 of recipient 1 107 to obtain the user private key of recipient 1 107 to access the user credential issued to recipient 1 107. A similar protocol is enacted for recipient N 108 and keystore 118. In addition to a mobile device such as a computer, tablet, or smartphone, keystores 117 through 188 for recipients 1 107 through 108 may take the form of an RFID badge, NFC tag, Bluetooth-compatible hardware, USB dongles, link-local IP addresses on Wi-Fi chips, optical tags and patterns capable of being read by sensors (e.g., one-dimensional bar codes, Quick-Response (QR) codes, DataMatrix, et cetera), or physical cards with magnetic stripes, integrated circuits, and EMV chips. The keystore may be a pre-existing provisioned device prepared to receive user issuance, or a newly-generated device provisioned in response to a specific need as it arises, such as a printed badge following a request for access delegation. A user skilled in the art will recognize that these methods for information exchange between devices are listed explicitly as examples not to be considered as a limitation of the disclosed technology, and a variety of other close-range communication technologies exist within the scope of the disclosed technology.

Administrative device 112 and recipient device 116 within system 100A interact with a decentralized network 164, wherein decentralized network 164 comprises a plurality of decentralized network nodes such as decentralized networked node 124. In some implementations of the technology disclosed, decentralized network 164 is a private permissioned blockchain data structure. In other implementations, decentralized network 164 is an alternative decentralized personal ledger data structure.

In the interconnection of the elements of system 100B, communication may occur over one or more cloud servers. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi, and WiMAX.

System 100B is configured to provision user credentials for access to a decentralized networked node 124 within decentralized network 164, to which access has been limited to users authorized by decentralized networked node 124.

Credential administration logic 122 running on administrative device 112 may behave similarly in both system 100A involving single-tenant recipient device 116 and system 100B involving multi-tenant workgroup device 128. A user skilled in the art will recognize that user credentialing may respectively comprise non-overlapping parameters or metadata to appropriately fit the particular implementation.

Recipient public key generation logic 138, recipient credential retrieval logic 148, recipient credential decryption logic 158, and authentication logic 168 operating on workgroup device 128 may behave similarly to recipient public key generation logic 126, recipient credential retrieval logic 136, recipient credential decryption logic 146, and authentication logic 156 operating on recipient device 116. A user skilled in the art will recognize that recipient public key generation user access credential retrieval may each respectively comprise non-overlapping parameters or metadata to appropriately fit the particular implementation. In particular, logics 138, 148, 158, and 168 operate using the recipient private key stored on each respective recipient keystore, such that the recipient private key is temporarily stored on workgroup device 128 and erased following authentication.

Further continuing with the description of the system 100B, components of FIG. 1B are implemented by software running on varying types of computing devices. Example devices are a workstation, a server, a computing cluster, a blade server, and a server farm, or any other data processing system or computing device. The engine can be communicably coupled to the databases via a different network connection.

While system 100B is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Decentralized Credential Issuance

To elaborate further on the interconnectedness of the components of system 100A and the components of system 100B, respectively, a series of message flow diagrams are now described for the provisioning of user credentials leveraging private keys stored locally on provisioned devices.

Figure 2A:
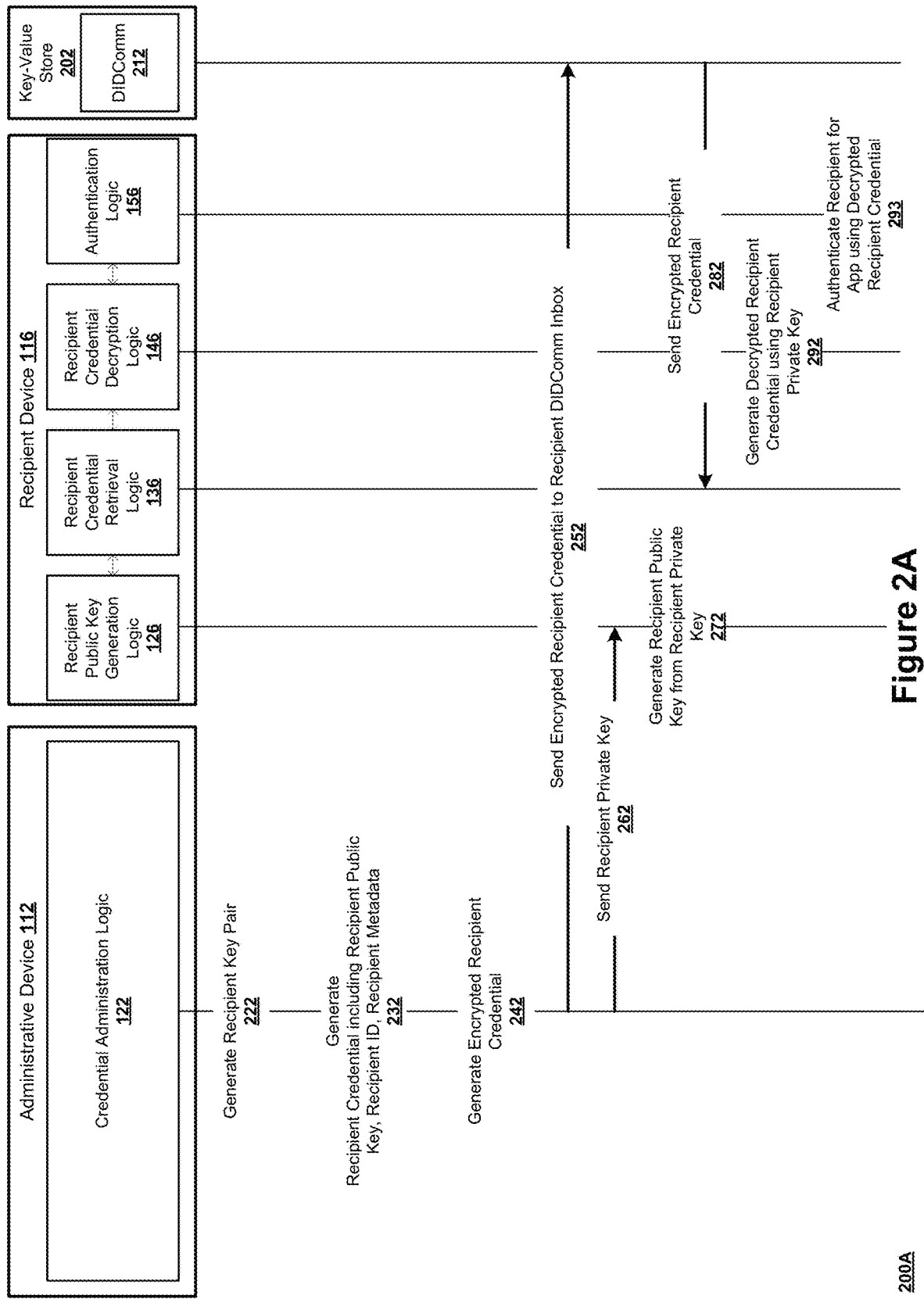
FIG. 2A shows a message flow diagram for user credentialing wherein a recipient device is used by a single recipient.

FIG. 2A shows a message flow diagram 200A for user credentialing wherein a recipient device is used by a single recipient. An administrative device 112 (including a credential administration logic 122) and a recipient device 116 (including a recipient public key generation logic 126, recipient credential retrieval logic 136, recipient credential decryption logic 146, and authentication logic 156) interact with a key-value store 202 that comprises a DIDComm messaging protocol 212, wherein recipients have recipient public key-indexed DIDComm Inboxes to and from which user credentials or access credentials may be transmitted.

Double-sided arrows in between recipient public key generation logic 126, access credential retrieval logic 136, access credential decryption logic 146, and authentication logic 156 indicate data communication between these logics, and it is to be understood that for diagram clarity, data and information generated by a particular logic component within recipient device 116 are accessible to other logic components within recipient device 116.

For an administrator intending to provision credentials to a particular recipient, step 222 involves the credential administration logic 122 generating a recipient public-private key pair. Next, in step 232, credential administration logic 122 generates a recipient credential comprising the recipient public key, recipient ID (e.g., a username, identification number, email address, or cell phone number), and additional recipient metadata that may correspond to the recipient's clearance level, role, organization, and qualifications.

In step 242, the generated recipient credential is encrypted by credential administration logic 122 using the administrative private key and recipient public key. The encrypted recipient credential is sent by credential administration logic 122 to the recipient's DIDComm inbox in step 252. In many implementations, encryption and transmission of the recipient credential use DIDComm messaging protocol and ECDH key exchange.

In some implementations, the administrative private key used for encryption is an ephemeral administrative private key such that the private key is produced for ECDH exchange, and then the administrator authenticates separately by ECDSA-signing using the administrator's credential private key (where the administrator credential private key is a long-lived private key and different from the ephemeral key). Within a XATP implementation, an ephemeral administrative private key is generated, but the credential itself possesses all of the necessary content and thus no signature is necessary. Because the recipient private key to be stored on recipient device 116 is sufficient to decrypt the encrypted recipient credential, the ephemeral administrative private key is deleted following the single-use of encrypting the recipient credential. The key-value store 202 will store the encrypted recipient credential indexed by the recipient public key, where it is retrievable by the recipient via the recipient private key.

Next, in step 262, the credential administration logic 122 transmits the recipient private key to the recipient device 116. Following steps 252 and 262, the recipient key pair, recipient credential, and ephemeral administrative private key are erased from the administrative device (e.g., administrative device 112) for privacy protection.

Once the encrypted recipient credential is stored in the recipient's DIDComm inbox 212, it can be accessed by the recipient device 116 using the recipient private key. This may be triggered by a notification sent by the decentralized network 164 to the recipient via recipient device 116 notifications or other forms of communication such as email, telephone, or supervisor confirmation, or triggered by the recipient requesting to check for this information using recipient device 116. To retrieve the encrypted recipient credential, the recipient public key is necessary to query the key-value store 202. In step 272, the recipient public key generation logic 126 generates the recipient public key from the recipient private key, so that the recipient private key may be used by the recipient credential retrieval logic 136 to request the encrypted recipient credential from key-value store 202. Key-value store 202 sends the encrypted recipient credential via DIDComm 212 protocol in step 282. In step 292, recipient credential decryption logic 146 generates the decrypted recipient credential using the recipient private key. Finally, once the recipient credential has been decrypted, it can be used by authentication logic 156 in step 293 to authenticate the recipient for an application, decentralized application ("DApp"), permissioned function, or authority to access a network node to invoke services that conduct operations using decentralized network 164 to which access has been limited to users authorized by one of the decentralized networked nodes, such as decentralized network node 124.

In many scenarios, the use of a shared directory such as key-value store 202 is not feasible or efficient. Some complex operational environments may involve different levels of credentials with large numbers of employees in different departments and locations, therefore a single directory would be unwieldy. Other operations might involve users from different organizations that do not share a common ledger, such as external auditors or partner organizations. Many real-world use cases for the disclosed systems involve a credentialed user who wishes to share access with an uncredentialed user.

In these use cases, the sender needs the recipient to have a device credential to which access can be delegated, and the device credential needs to be discoverable by the sender. Communication channels such as email and SMS involve significant security vulnerabilities. Alternatively, near-range communication between devices, such as those previously described for recipient keystore hardware devices, offers a way for a user to be credentialed without sharing of private keys or other sensitive information. Devices for close-range communication of access credentials may involve any combination of computers, mobile phones, RFID/NFC technology, hardware wallets, or any other pair of devices capable of locally exchanging information.

In an embodiment of the disclosed system that does not use key-value store 202 for credential exchange, a sender (i.e., administrator 102) has a device (i.e., administrative device 112) with an application leveraging an onboard private key that is generated at the time that the application is downloaded. The onboard private key (which may be referred to as a "device credential" herein) is independent from any other keys or identity credentials that may be held on the device, such as the user credential of administrator 102. The recipient uses a device that also possesses an application (wherein the application is the same application on administrative device 112, a similar or corresponding application to that on administrative device 112, or a distinct-but-related application to that on administrative device 112) leveraging a separate onboard private key generated at the time that the application was downloaded. The onboard private key or device credential is independent from any other keys or identity credentials that may be held on the device and is not equivalent to a user credential for the recipient.

The sender's device requests the public key of the recipient device (alternatively, the transaction may be initiated by the sender and recipient together as compared to initiated by the sender alone) and the recipient device provides the public key through a localized method of information exchange. The localized method of information exchange bypasses server channels; hence, no private key information is shared with the cloud. The sender is presented with a plurality of smart contract options and selects one or more options including smart contract conditions and limitations. Upon generation of the smart contract, a smart contract public-private key pair is also generated. In one implementation of the technology disclosed, such as a scenario in which the recipient's role within the enterprise is limited, the smart contract is included in an encrypted access credential along with the smart contract public key and the recipient device's public key. In another implementation of the technology disclosed, such as a scenario in which the recipient's role within the enterprise is on-going and the recipient requires issuance of credentials, access delegation logic 122 generates a recipient credential at the same time as the access credential. Thus, a new private key is set up for the recipient and transmitted onto the recipient device using close-range communication. The access credential will contain the smart contract public key, the newly-generated recipient public key, and the smart contract.

As previously described in the description of diagrams 200A, the encrypted credential is stored on the key-value store and can be accessed by the recipient device at any time. The recipient device uses its device credentials to access the appropriate DIDComm inbox and receive the encrypted credential, which is decrypted using the appropriate private key (either the device private key or the newly-generated recipient private key) and the recipient can be authenticated using the decrypted credential.

Thus far, the discussion has addressed that a recipient private key may be stored on a mobile device, such as a smartphone, or on a keystore, such as an RFID badge to be read by a device that may be single-tenant or multi-tenant. The message flow diagram in system 200B primarily focuses on embodiments in which a recipient private key is stored directly on a device that runs the application to which the user is requesting access. In contrast, the discussion now turns to a similar scenario in which the recipient keystore storing the recipient private key is distinct from a workgroup device, shared by multiple users, that runs the application to which the user is requesting access.

Figure 2B:
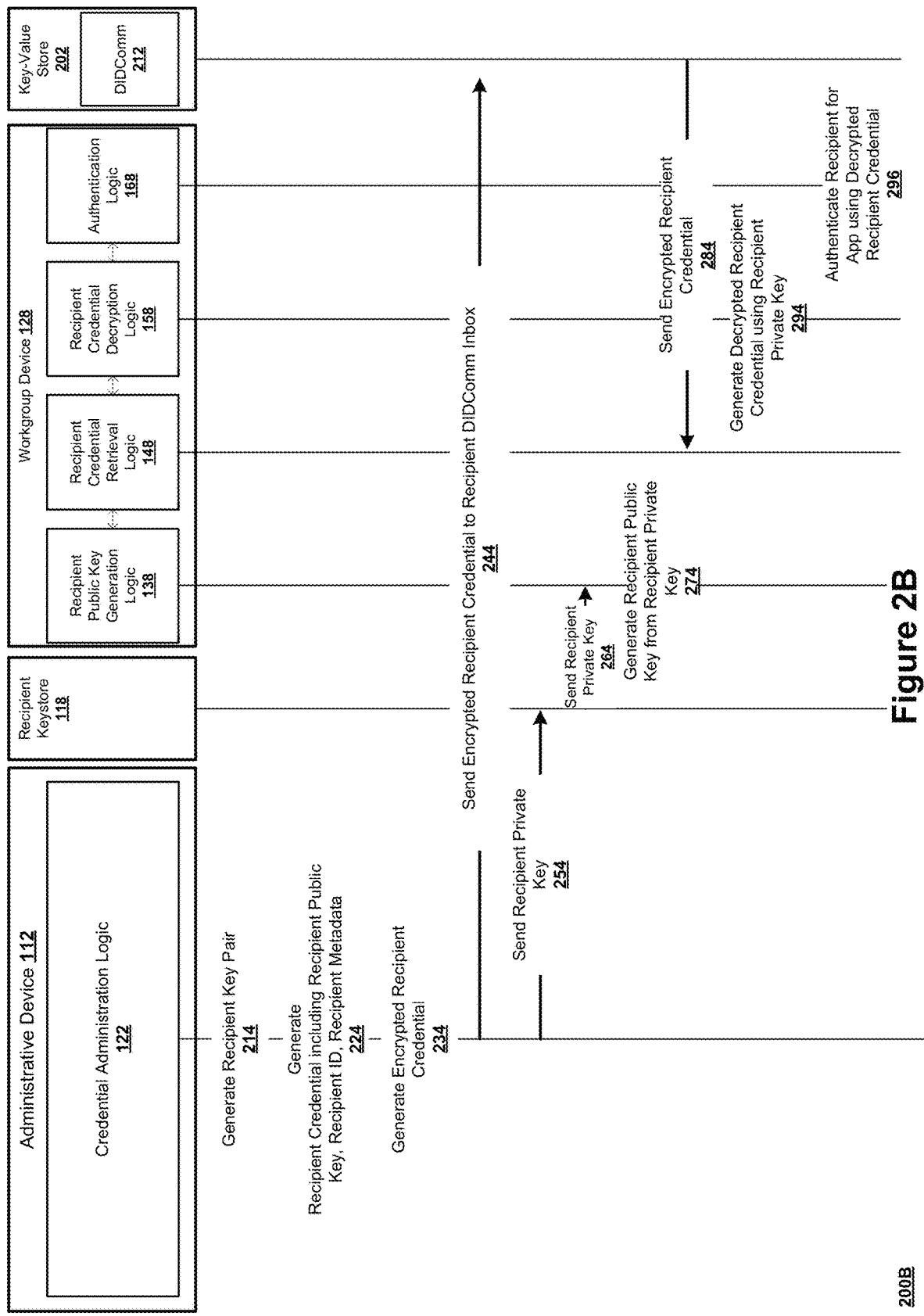
FIG. 2B shows a message flow diagram for user credentialing wherein a workgroup device is used by a plurality of recipients.

FIG. 2B shows a message flow diagram 200B for user credentialing wherein a workgroup device is used by a plurality of recipients. An administrative device 112 (including a credential administration logic 122) and a workgroup device 128 (including a recipient public key generation logic 138, recipient credential retrieval logic 148, recipient credential decryption logic 158, and authentication logic 168) interact with a key-value store 202 that comprises a DIDComm messaging protocol 212, wherein recipients have recipient public key-indexed DIDComm Inboxes to and from which user credentials or access credentials may be transmitted. Double-sided arrows in between recipient public key generation logic 138, recipient credential retrieval logic 148, recipient credential decryption logic 158, and authentication logic 168 indicate data communication between these logics, and it is to be understood that for diagram clarity, data and information generated by a particular logic component within workgroup device 128 are accessible to other logic components within workgroup device 128.

Key-value store 202 comprises DIDComm messaging protocol 212. For an administrator intending to provision credentials to a particular recipient, step 214 involves the credential administration logic 122 generating a recipient public-private key pair. Next, in step 224, credential administration logic 122 generates a recipient credential comprising the recipient public key, recipient ID (e.g., a username, identification number, email address, or cell phone number), and additional recipient metadata that may correspond to the recipient's clearance level, role, organization, and qualifications.

In step 234, the generated recipient credential is encrypted by credential administration logic 122 using the administrative private key and recipient public key. The encrypted recipient credential is sent by credential administration logic 122 to the recipient's DIDComm inbox in step 244. In many implementations, encryption and transmission of the recipient credential use DIDComm messaging protocol and ECDH key exchange, as previously described for transmission of user credentials within system 200A. Again, the smart contract private key used during encryption may be an ephemeral key.

Next, in step 254, the credential administration logic 122 transmits the recipient private key to the recipient keystore 118. Following steps 244 and 254, the recipient key pair, recipient credential, and ephemeral administrative private key are erased from the administrative device (e.g., administrative device 112) for privacy protection.

Once the encrypted recipient credential is stored in the recipient's DIDComm inbox 212, it can be accessed by the workgroup device 128 using the recipient private key. However, in the multi-tenant device embodiment, the private key is stored on recipient keystore 118 as compared to storage on the workgroup device 128. Notification of the newly provisioned user credential may be triggered by a notification sent by the decentralized network 164 to the recipient via forms of communication such as email, telephone, or supervisor confirmation, or triggered by the recipient requesting to check for this information using workgroup device 128 via presenting the recipient keystore 118 to the device for close-range communication, as performed in step 264. To retrieve the encrypted recipient credential, the recipient public key is necessary to query the key-value store 202. In step 274, the recipient public key generation logic 138 generates the recipient public key from the recipient private key, so that the recipient private key may be used by the recipient credential retrieval logic 148 to request the encrypted recipient credential from key-store 202. Key-store 202 sends the encrypted recipient credential via DIDComm 212 protocol in step 284. In step 294, recipient credential decryption logic 158 generates the decrypted recipient credential using the recipient private key. Finally, once the recipient credential has been decrypted, it can be used by authentication logic 168 in step 296 to authenticate the recipient for an application, decentralized application ("DApp"), permissioned function, or authority to access a network node to invoke services that conduct operations using decentralized network 164 to which access has been limited to users authorized by one of the decentralized networked nodes, such as decentralized network node 124.

Decentralized Identifier Communication Exchange of User Credentials

The disclosed system implements issuance of recipient credentials leveraging private keys on provisioned devices. The generation and deployment of these recipient credentials will now be elaborated upon further.

Figure 3A:
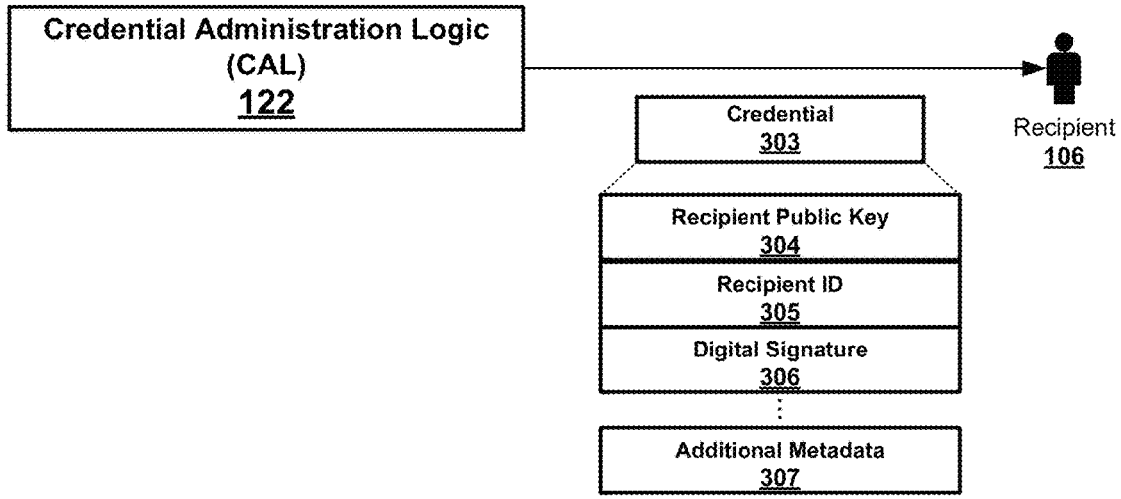
FIG. 3A shows a sequence of flow diagrams for sending an encrypted user credential to a recipient's registered DIDComm inbox via end-to-end encryption.
Figure 3A:
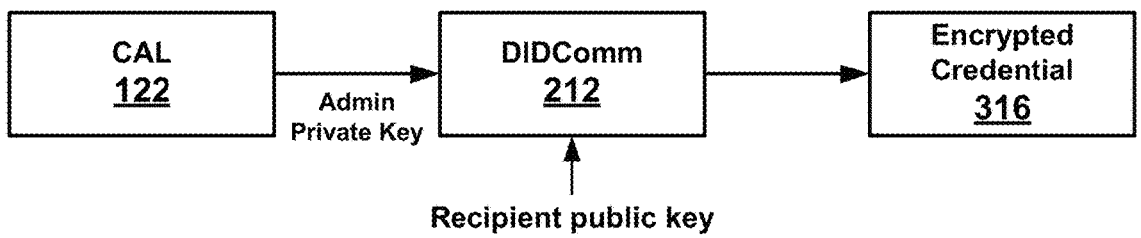
Figure 3A:
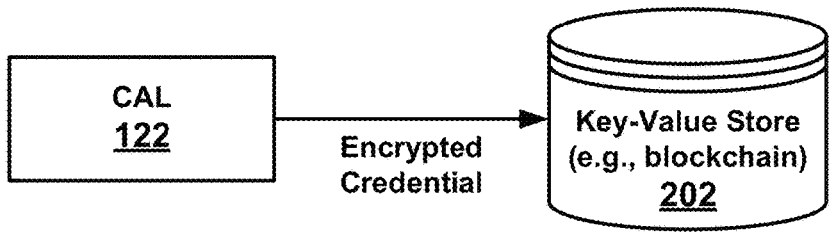
Figure 3A:

FIG. 3A shows a sequence of flow diagrams 300A for sending an encrypted user credential to a recipient's registered DIDComm inbox via end-to-end encryption. Prior to the sequence of events depicted, it is assumed that the credentialing logic 132 has already received necessary user data to perform issuance of a user credential for the recipient. First, credential provisioning and administration 300 comprises the credential administration logic 122 assigning credential 303 to a recipient 106. Credential 303 comprises a recipient public key 304, a recipient ID 305, a digital signature from a trusted authority 306, and additional metadata 307, as previously described in this Application. Credential 303 is temporarily stored on administrative device 112, as previously described.

Within credential encryption step 310, the credential administration logic 122 generates an encrypted credential 316 via encrypting credential 303 using the recipient public key and the administrative private key using DIDComm 212 protocol and ECDH for end-to-end encryption. Next, encrypted credential upload step 320 comprises the transfer of the encrypted credential 316 from the credential administration logic 122 on administrative device 112 to the key-value store 202. Additionally, the administrative device 112 performs recipient private key transmission step 330, such that the credential administration logic 122 stores the recipient private key onto a recipient keystore 118.

Finally, once the encrypted credential 316 is stored on the key-value store 202 and the recipient private key is stored on keystore 118, the administrative device 112 runs the privacy protection logic 142 in step 340 to remove all sensitive data from the administrative device 112, such as the ephemeral administrative private key, the recipient public-private key pair, and any data related to the recipient credential 303. The encrypted recipient credential 316 is accessible to recipient device 116 (or workgroup device 128) within the key-value store 202 via querying by the recipient public key.

Figure 3B:
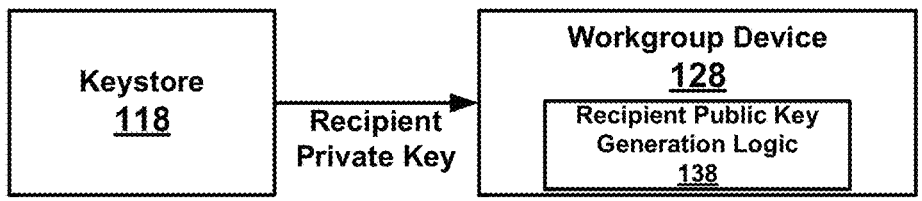
FIG. 3B shows a sequence of flow diagrams for issuing credentials to a recipient using decryption of an encrypted user credential received via DIDComm messaging protocol.
Figure 3B:
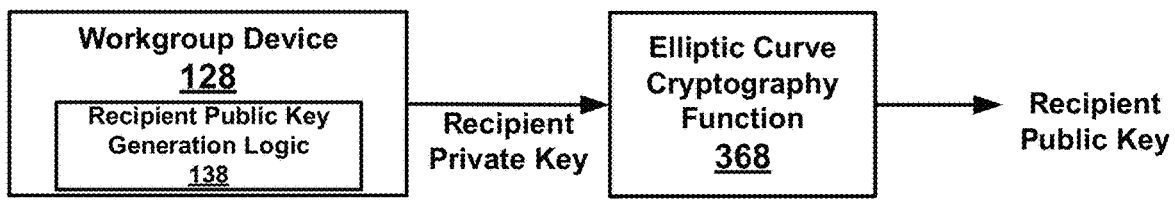
Figure 3B:
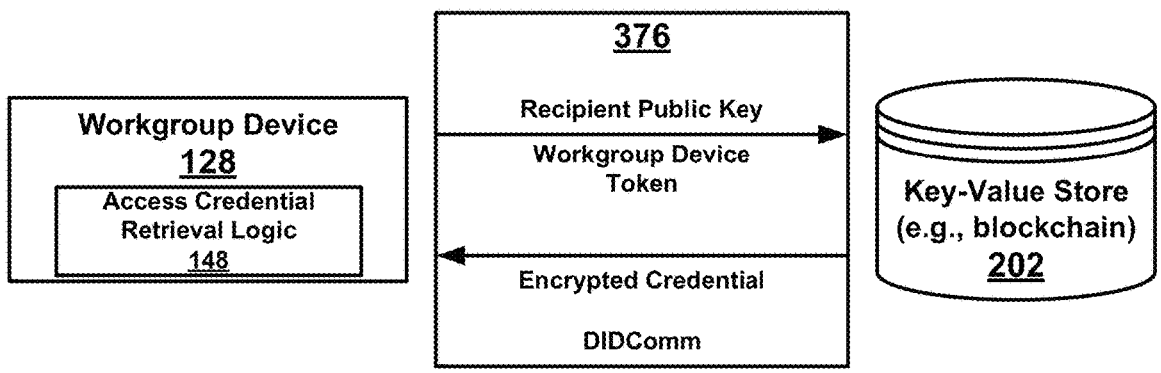
Figure 3B:
Figure 3B:
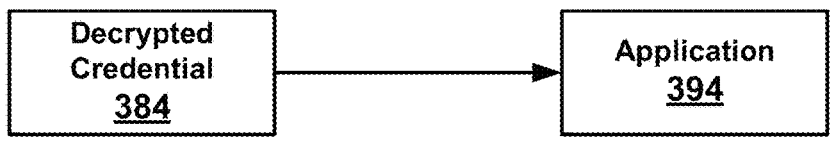

FIG. 3B shows a sequence of flow diagrams 300B for issuing credentials to a recipient using decryption of an encrypted user credential received via DIDComm messaging protocol. The sequence of steps mirrors that of the credentialing process described in system 100B, transitioning from recipient private key exchange 350 to recipient public key generation 360, to credential retrieval 370, to credential decryption 380, and finally, to recipient authentication 390.

First, recipient private key exchange 350 is performed such that a recipient keystore 118 provides the recipient private key to a workgroup device 128, where workgroup device 128 is configured to run recipient public key generation logic 138. This step is a necessary precursor to obtaining the credential because the recipient private key is exclusively stored on keystore 118. Next, recipient public key generation 360 comprises the recipient public key generation logic 138 (running on workgroup device 128) processing the recipient private key as input for an elliptic curve cryptography function 366 to generate a recipient public key as output.

The recipient public key can be used within credential retrieval 370. Access credential retrieval logic 148, running on workgroup 128, provides the recipient public key (used to query the key-value store 202 for the appropriate access credential) and workgroup device token or credential (the workgroup device credential has been delegated access to the key-value store 202 to receive the appropriate recipient credential) with the key-value store 202 in exchange for the encrypted credential 316, sent using DIDComm messaging. Once the encrypted credential 316 has been retrieved, credential decryption 380 (carried out by workgroup device 128 via credential decryption logic 158) decrypts the encrypted credential 316 with the recipient private key to obtain the decrypted credential 384.

Finally, recipient authentication 390 (carried out by workgroup device 128 via authentication logic 168) can use the decrypted credential 384 to access an application 394. Following authentication, any information corresponding the recipient credential or any access credentials delegated to the recipient (e.g., the recipient private key, recipient public key, recipient user ID, a smart contract, smart contract public key, or any other recipient metadata).

Once a user credential has been transmitted to the recipient in sequences 300A and 300B, the recipient can also be delegated one or more access credentials, wherein an access credential comprises a plurality of conditional access terms within a smart contract, such that the access a recipient is delegated to a particular network node is limited in one or more fashions. As an example, delegation of some of the authority to access the network node for a limited duration of time may comprise an evanescent credential such that an automatic deletion is performed of any evidence supporting the recipient at an expiry of the duration of time. Smart contract conditions are defined within the access delegation of a Sender P authorizing a Recipient N to access a particular function, digital resource (e.g., a form of data or information stored on decentralized network 164), or physical resource.

Decentralized Access Delegation Workflows

Within the disclosed system, a broad variety of implementation components and possible permutations have been introduced in an isolated context. FIGS. 4-8 involve detailed example workflows combining the various system components previously introduced in a cohesive process for a plurality of potential embodiments.

Figure 4:
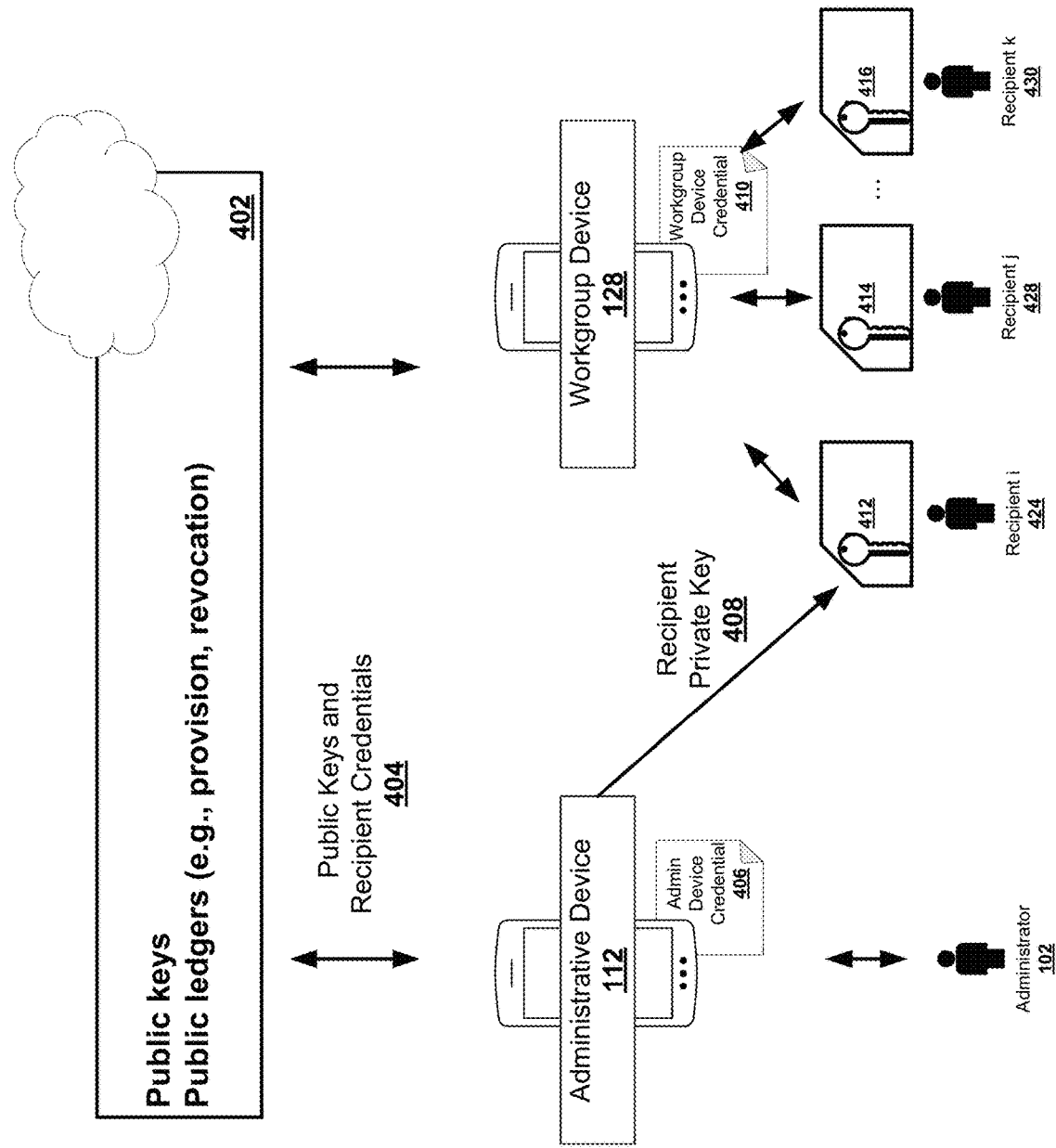
FIG. 4 shows a schematic diagram for the issuance of user credentials leveraging a private key stored on a keystore read by a multi-tenant provisioned device.

FIG. 4 shows a schematic diagram 400 for the issuance of user credentials leveraging a private key stored on a keystore read by a multi-tenant provisioned device. The embodiment depicted in diagram 400 comprises a cloud-based server 402 (which may be a decentralized network 164 or other decentralized database or server), administrative device 112 accessed by administrator 102, and a workgroup device 128 accessed by recipient i 424, recipient j 428, and recipient k 430. Although there are three recipients listed in this example, any number of recipients can authenticate using the same workgroup device 128.

Administrative device 112 has already been provisioned with a set of administrative device credentials 406 and administrative device credentials 406 have been delegated access to privileges necessary to issue other user and device credentials, as well as privileges necessary to access a key-value store and transactional ledgers on cloud-based server 402. Workgroup device 128 has also previously been provisioned with a set of workgroup device credentials 410, and workgroup device credentials 410 have been delegated access to privileges necessary to access a key-value store on cloud-based server 402.

When administrator 102 intends to provision user credentials to recipient i 424, recipient j 428, or recipient k 430, administrator 102 accesses the credential administration logic 122 on administrative device 112 using protocols as described in FIGS. 1B and 2B. Administrative device 112 transmits any public keys and recipient credentials 404 to the key-value store on cloud-based server 402, and a provisioning transaction is also recorded on cloud-based server 402. Administrative device 112 stores the respective recipient private key 408 for each user on the appropriate keystore, such as recipient i 424's keystore 412, recipient j 484's keystore 414, or recipient k 430's keystore 416.

Following issuance of credentials via the credential issuance logic 132, administrative device 112 employs privacy protection logic 142 to erase all sensitive information related to issuance transactions from administrative device 112. At this stage, recipient private keys 408 are exclusively stored and locally sequestered on recipient keystores 412, 414, and 416. Each recipient, such as recipient i 424 along with keystore 412, is now able to use their respective keystore to authenticate into workgroup device 128 as previously described in FIGS. 1B and 2B. Once authenticated, the user will be able to access any privileges delegated to their credential by administrator 102, such as access to a decentralized networked node 124 within decentralized network 164.

Figure 5:
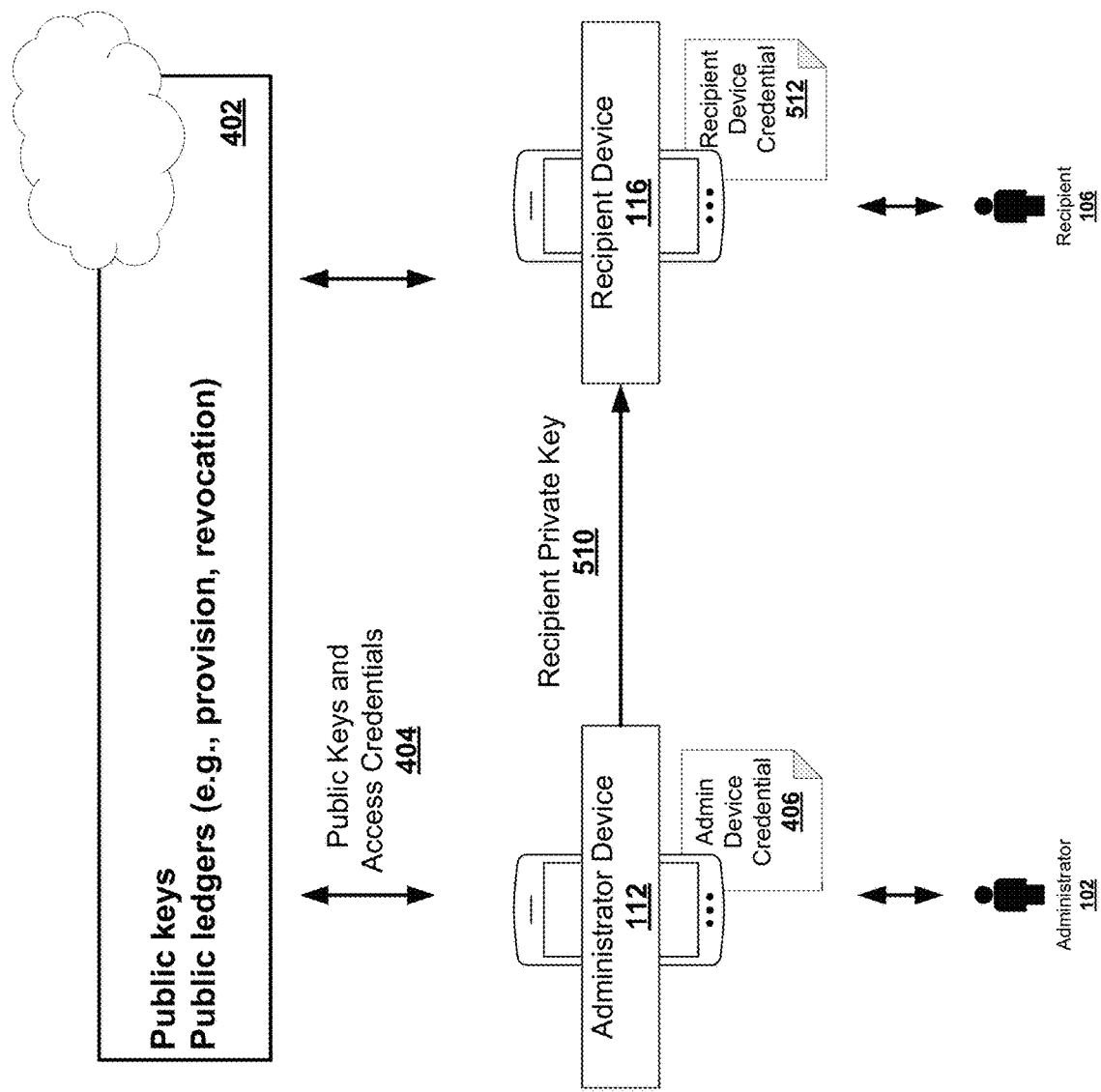
FIG. 5 shows a schematic diagram for the issuance of user credentials leveraging a private key stored on a keystore read by a single-tenant provisioned device.

In contrast to FIG. 4, FIG. 5 turns to an embodiment in which the recipient device is synonymous with the recipient keystore. FIG. 5 shows a schematic diagram 500 for the issuance of user credentials leveraging a private key stored on a keystore read by a single-tenant provisioned device. The embodiment depicted in diagram 500 comprises a cloud-based server 402 (which may be a decentralized network 164 or other decentralized database or server), administrative device 112 accessed by administrator 102, and a recipient device 116 accessed by recipient 106. As in FIG. 4, administrative device 112 has already been provisioned with a set of administrative device credentials 406 and administrative device credentials 406 have been delegated access to privileges necessary to issue other user and device credentials, as well as privileges necessary to access a key-value store and transactional ledgers on cloud-based server 402. Recipient device 116 has also previously been provisioned with a set of recipient device credentials 512, and recipient device credentials 512 have been delegated access to privileges necessary to access a key-value store on cloud-based server 402.

When administrator 102 intends to provision user credentials to recipient 106, administrator 102 accesses the credential administration logic 122 on administrative device 112 using protocols as described in FIGS. 1A and 2A. Administrative device 112 transmits any public keys and recipient credentials 404 to the key-value store on cloud-based server 402, and a provisioning transaction is also recorded on cloud-based server 402. Administrative device 112 stores the recipient private key 510 for recipient 106 on recipient 116.

Following issuance of credentials via the credential issuance logic 132, administrative device 112 employs privacy protection logic 142 to erase all sensitive information related to issuance transactions from administrative device 112. At this stage, recipient private key 510 is exclusively stored and locally sequestered on recipient device 116. Recipient 106 is now able to authenticate into recipient device 116 as previously described in FIGS. 1A and 2A. Once authenticated, recipient 106 will be able to access any privileges delegated to their credential by administrator 102, such as access to a decentralized networked node 124 within decentralized network 164.

Figure 6:
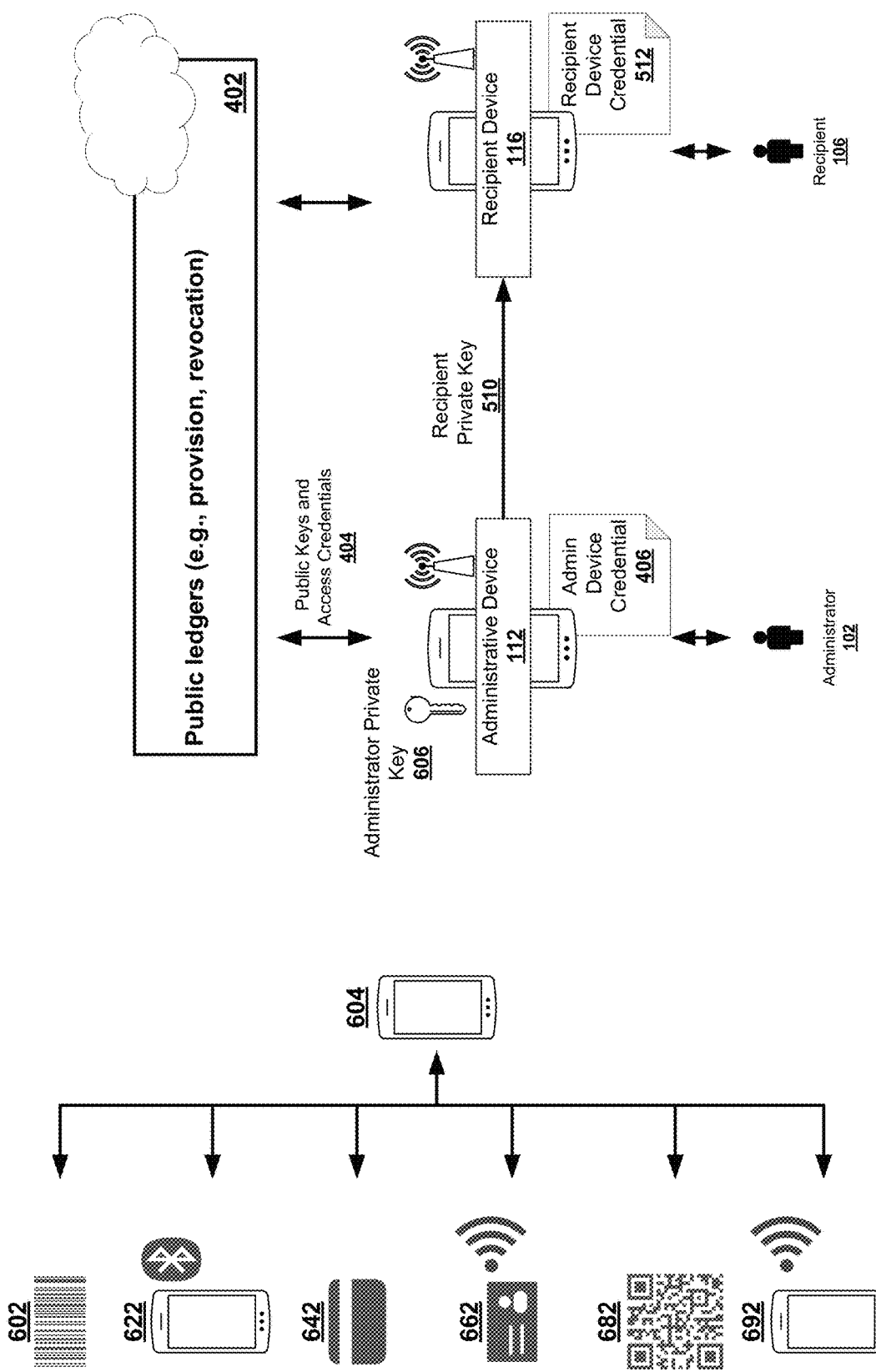
FIG. 6 shows a schematic diagram for the issuance of user credentials leveraging a private key stored on a keystore read by a single-tenant provisioned device via a plurality of close-range communication methods.

FIG. 6 shows a schematic diagram 600 for the issuance of user credentials leveraging a private key stored on a keystore read by a single-tenant provisioned device via a plurality of close-range communication methods. FIG. 6 elaborates further on the technology enabling the credential issuance process depicted in FIG. 5. The system disclosed allows administrators within an enterprise to quickly and efficiently issue user credentials (as well as delegate access credentials to a user) through close-range communication methods, effectively bypassing any server-side channels; hence, preventing any user private keys from ever being transmitted over cloud-based server 402 or decentralized network 164.

The schematic diagram from FIG. 5 is presented again within FIG. 6 for added context, comprising an administrator 102 using administrative device to provision a recipient credential to recipient 106 via recipient device 116, wherein both devices are credentialed to access cloud-based server 402. The process occurs over close-range communication channels, using hardware technology such as the examples shown in illustrations 602, 622, 642, 662, 682, and 692. Within the user credential issuance process, both administrator 102 and recipient 106 may use a mobile device such as smartphone 604. However, either or both devices may be exchanged for an alternative mobile hardware device without deviating from the scope or spirit of the disclosed system.

Smartphone 604 may communicate to another device using Bluetooth such as smartphone 622, or a form of close-range technology such as RFID, NFC, link-local IP addresses on Wi-Fi chips, or integrated circuit technology within smartphone 692. In addition to smartphones, a variety of other forms of hardware exist such as an optical tags and patterns capable of being read by sensors (e.g., one-dimensional bar code 602 or Quick-Response (QR) code 682 within a badge or tag), badge 662 equipped with RFID, NFC, or USB dongle components, or a physical card 642 with magnetic stripes, integrated circuits, and EMV chips. The keystore may be a pre-existing provisioned device prepared to receive user issuance, or a newly-generated device provisioned in response to a specific need as it arises, such as a printed badge following a request for access delegation. A user skilled in the art will recognize that these methods for information exchange between devices are listed explicitly as examples not to be considered as a limitation of the disclosed technology, and a variety of other close-range communication technologies exist within the scope of the disclosed technology.

While the embodiment depicted within FIG. 5 and FIG. 6 may be sufficiently secure for some operations, many enterprises may desire an extra level of authentication necessary to protect sensitive data. Thus, the enterprise may desire to provision both a recipient device and a separate recipient keystore to the recipient, such that the recipient keystore serves as the key and the recipient device serves as the lock, achieving two-factor authentication. For additional regulation of IAM systems, enterprises may also provision user credentials to one or more "super-administrators" responsible for the management of administrative credentials for one or more administrators.

Figure 7:
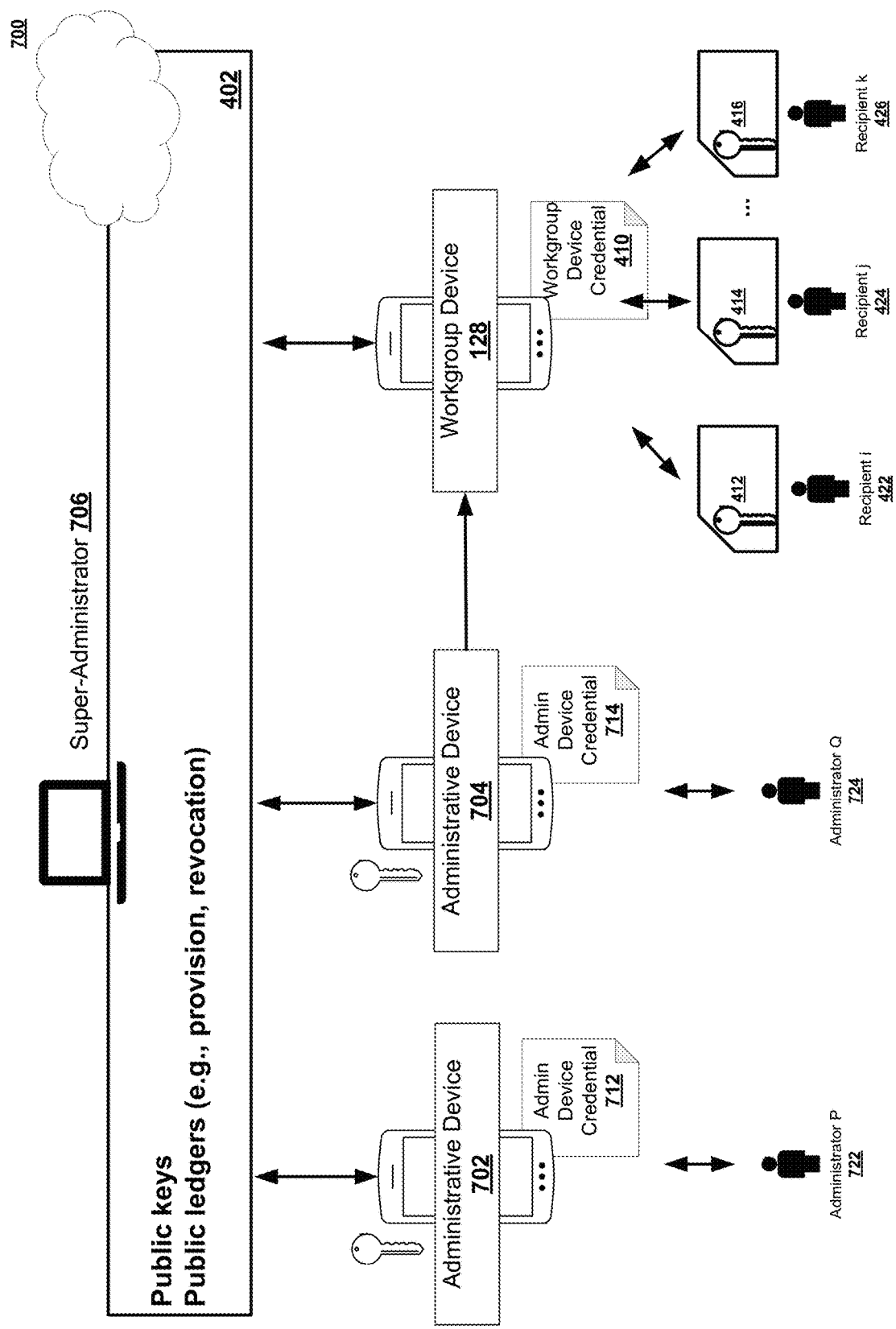
FIG. 7 shows a schematic diagram for the issuance of user credentials leveraging a private key stored on a keystore read by a provisioned device, wherein the provisioning of credentials by an administrator is overseen by a super-administrator.

FIG. 7 shows a schematic diagram 700 for the issuance of user credentials leveraging a private key stored on a keystore read by a provisioned device, wherein the provisioning of credentials by an administrator is overseen by a super-administrator. The embodiment depicted in diagram 400 comprises a cloud-based server 402 (which may be a decentralized network 164 or other decentralized database or server), administrative devices 702 and 704 accessed by administrator P 722 and administrator Q 724 respectively, and a workgroup device 128 accessed by recipient i 424, recipient j 428, and recipient k 430. Although there are three recipients listed in this example, any number of recipients can authenticate using the same workgroup device 128. In addition, the embodiment within diagram 700 also includes a super-administrator 706.

Super-administrator 706 has provisioned administrative devices 702 and 704 with a set of administrative device credentials 712 and 714, respectively. Administrative device credentials 712 and 714 have been delegated access by the super-administrator 706 to privileges necessary to issue other user and device credentials, as well as privileges necessary to access a key-value store and transactional ledgers on cloud-based server 402. Workgroup device 128 has also previously been provisioned with a set of workgroup device credentials 410, and workgroup device credentials 410 have been delegated access to privileges necessary to access a key-value store on cloud-based server 402, where provisioning and delegation have been performed by either a super-administrator or an administrator.

When administrator P 722 or administrator Q 724 intends to provision user credentials to recipient i 424, recipient j 428, or recipient k 430, they access the credential administration logic 122 on administrative device 702 or 704 using protocols as described in FIGS. 1B and 2B. Administrative device 112 transmits any public keys and recipient credentials 404 to the key-value store on cloud-based server 402, and a provisioning transaction is also recorded on cloud-based server 402. The respective recipient private key for each user is stored on the appropriate keystore, such as recipient i 424's keystore 412, recipient j 484's keystore 414, or recipient k 430's keystore 416.

Following issuance of credentials via the credential issuance logic 132, administrative device 702 or 704 employs privacy protection logic 142 to erase all sensitive information related to issuance transactions from administrative device 702 or 704. At this stage, recipient private keys 408 are exclusively stored and locally sequestered on recipient keystores 412, 414, and 416. Each recipient, such as recipient i 424 along with keystore 412, is now able to use their respective keystore to authenticate into workgroup device 128 as previously described in FIGS. 1B and 2B. Once authenticated, the user will be able to access any privileges delegated to their credential by administrator P 722, administrator Q 724, or super-administrator 706, such as access to a decentralized networked node 124 within decentralized network 164.

In addition to manual provisioning of a keystore device, keystores may also be automatically provisioned by a hardware device, such as a printer.

Figure 8:
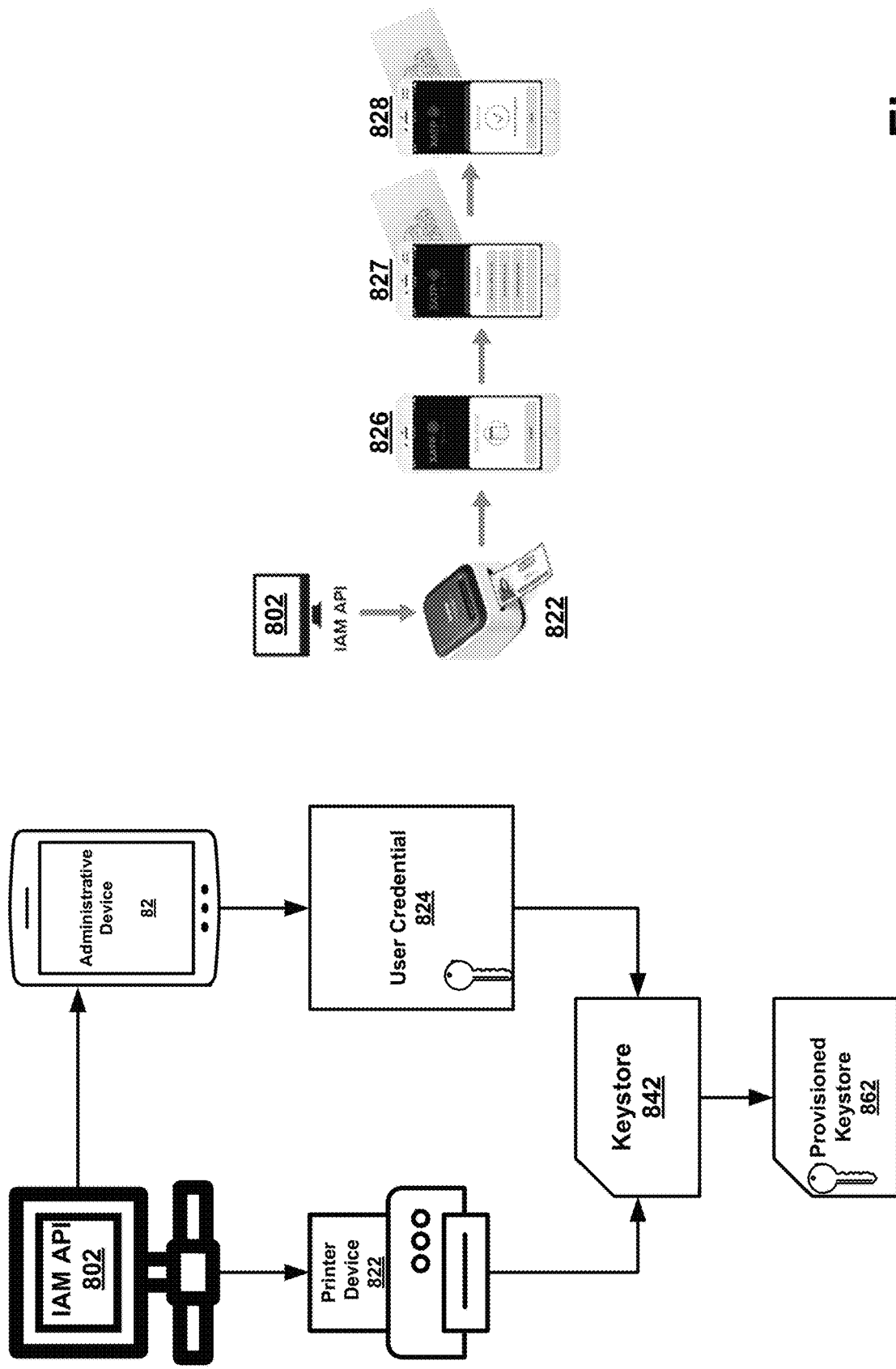
FIG. 8 shows a schematic diagram for the issuance of user credentials leveraging a private key stored on a keystore read by a provisioned device, wherein the keystore is printed by a printer device.

FIG. 8 shows a schematic diagram 800 for the issuance of user credentials leveraging a private key stored on a keystore read by a provisioned device, wherein the keystore is printed by a printer device. As shown in previous figures, prior to issuance of a keystore to a recipient, the keystore device itself must be provisioned with proper device credentials. Rather than manually provisioning device credentials by an administrator, it is also possible to print keystores using a printer device 822 as directed by an IAM API 802 so that a keystore 842 is configured to receive a user credential 824 by administrative device 112, resulting in a provisioned keystore 862. In addition to automatically provisioning the keystore 842 with device credentials, the IAM API 802 and printer device 822 may also produce a fully provisioned keystore 862 comprising any necessary device credentials and user credentials, ready to receive access delegated by an administrator.

In the workflow shown, IAM API 802 communicates with printer device 822 to print a badge fully provisioned with both the necessary device credentials and user credentials. The administrative device pictured at step 826 is ready to delegate access to the printed badge, and the administrator selects the desired smart contract conditions as shown in step 827. At this stage, the administrative device taps to the badge in 828, successfully delegating access to the recipient in an efficient manner.

Machine Learning Classifier

In response to one or more licensure authority servers communicating information to system 100 related to the approval, issuance, revocation, or suspension of a license, a trained classifier classifies the information as to whether or not a change in privilege or status of a credentialled individual is indicated, in one implementation of the technology disclosed.

In certain implementations of the technology disclosed, the disclosed classifier is a classification model (e.g., discriminant analyses, regression, decision trees, and so on). In other implementations of the technology disclosed, the disclosed classifier is a form of cluster analysis (e.g., hierarchical clustering, K-means, density-based spatial clustering of applications with noise (DBSCAN), and so on). In yet other technology implementations disclosed, other pattern recognition analyses may be implemented, such as ensemble learning (e.g., boosting, bagging, and so on), Bayesian networks, or Markov random fields. In any of the implementations mentioned above, feedforward neural networks, deep neural networks, convolutional neural networks, transformers, or autoencoders may also be applied as decision-making tools.

As a representative example, the discussion now turns to a description of a neural network as the trained classifier, in one implementation of the technology disclosed.

Figure 9:
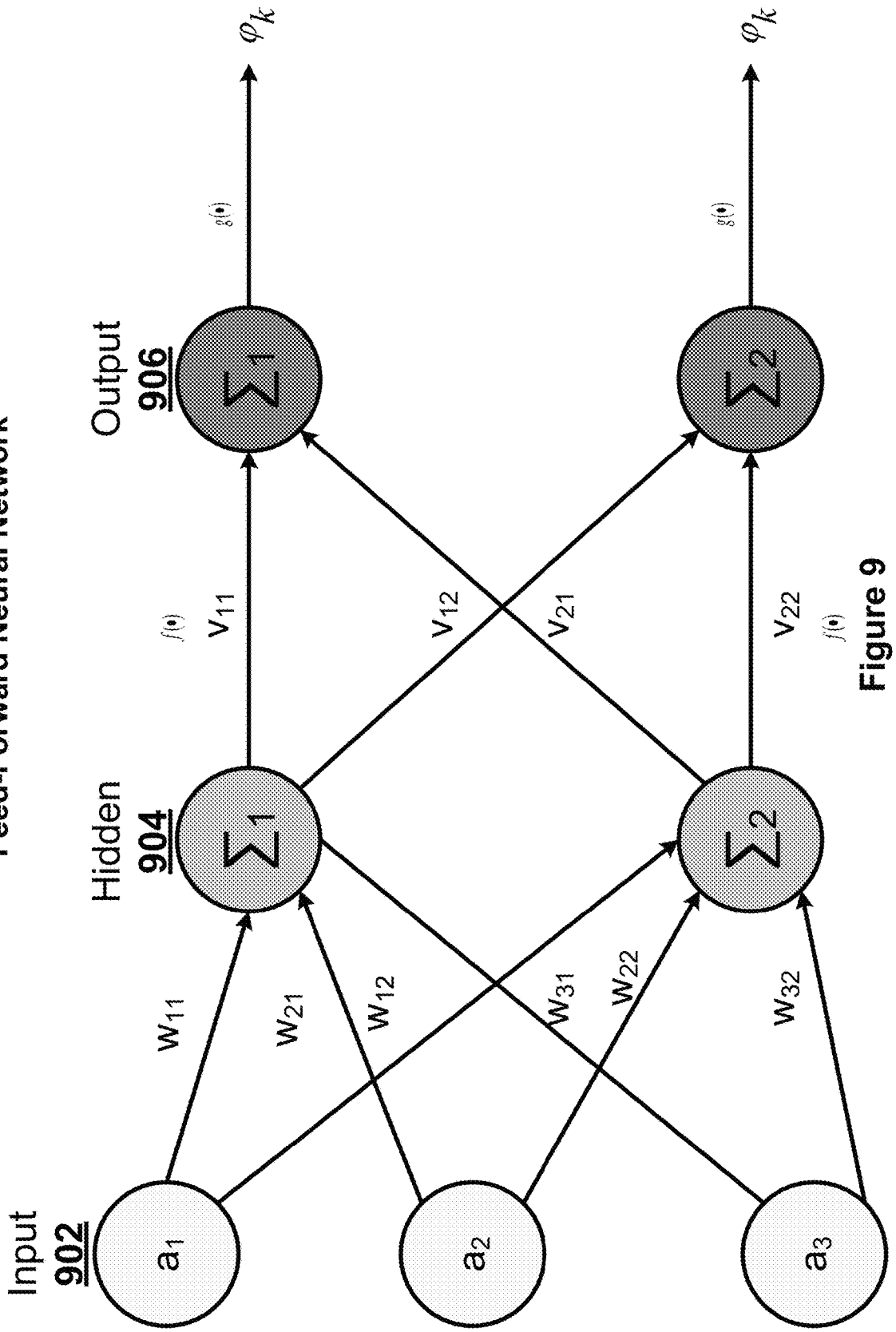
FIG. 9 illustrates a representative neural network suitable for implementing the disclosed technology.

FIG. 9 illustrates a representative neural network suitable for implementing the disclosed technology. Neural network 900 is a fully connected neural network with multiple layers. A neural network is a system of interconnected artificial neurons (e.g., a1, a2, a3) that exchange messages between each other. Neural network 900 has three inputs 902, two neurons in the hidden layer and two neurons in the output layer. The hidden layer 904 has an activation function $f(\cdot)$ and the output layer 906 has an activation function $g(\cdot)$. The connections have numeric weights (e.g., w11, w21, w12, w31, w22, w32, v11, v12, v21, v22) that are tuned during the training process, so that a properly trained network responds correctly when fed an image to recognize. The input layer 902 processes the raw input, the hidden layer 904 processes the output from the input layer based on the weights of the connections between the input layer and the hidden layer. The output layer 906 takes the output from the hidden layer and processes it based on the weights of the connections between the hidden layer and the output layer. The network includes multiple layers of feature-detecting neurons. Each layer has many neurons that respond to different combinations of inputs from the previous layers. These layers are constructed so that the first layer detects a set of primitive patterns in the input image data, the second layer detects patterns of patterns and the third layer detects patterns of those patterns.

Neural network 900 is trained through a back propagation algorithm, as described below.

FIG. 10 depicts a block diagram of training neural network 900 in accordance with one implementation of the technology disclosed. Neural network 900 is adjusted or trained so that the input data leads to a specific output estimate. Neural network 900 is adjusted using back propagation based on a comparison of the output estimate and the ground truth until the output estimate progressively matches or approaches the ground truth 1026.

Neural network 900 is trained by adjusting the weights between the neurons based on the difference between the ground truth and the actual output. This is mathematically described as:

$$\Delta w_i = x_i \delta$$

where δ=(ground truth)−(actual output)

In one implementation, the training rule is defined as:

$$w_{nm} \leftarrow w_{nm} + \alpha(t_m - \varphi_m) a_n$$

In the equation above: the arrow indicates an update of the value; $t_m$ is the target value of neuron m; $\varphi_m$ is the computed current output of neuron m; $a_n$ is input n; and α is the learning rate.

The intermediary step in the training includes generating a feature vector from the input data using the convolution layers. The gradient with respect to the weights in each layer, starting at the output, is calculated. This is referred to as the backward pass, or going backwards. The weights in the network are updated using a combination of the negative gradient and previous weights.

In one implementation, neural network 900 is trained by a stochastic gradient update algorithm (such as ADAM) that performs backward propagation of errors by means of gradient descent. One example of a sigmoid function based back propagation algorithm is described below:

$$\varphi = f(h) = \frac{1}{1 + e^{-h}}$$

In the sigmoid function above, h is the weighted sum computed by a neuron. The sigmoid function has the following derivative:

$$\frac{\partial \varphi}{\partial h} = \varphi(1 - \varphi)$$

The algorithm includes computing the activation of all neurons in the network, yielding an output for the forward pass. The activation of neuron m in the hidden layers is described as:

$$\varphi_m = \frac{1}{1 + e^{-hm}}$$

$$h_m = \sum_{n=1}^{N} a_n w_{nm}$$

This is done for all the hidden layers to get the activation described as:

$$\varphi_k = \frac{1}{1 + e^{hk}}$$

$$h_k = \sum_{m=1}^{M} \varphi_m v_{mk}$$

Then, the error and the correct weights are calculated per layer. The error at the output is computed as:

$$\delta_{ok} = (t_k - \varphi_k) \varphi_k (1 - \varphi_k)$$

The error 1006 in the hidden layers is calculated as:

$$\delta_{hm} = \varphi_m (1 - \varphi_m) \sum_{k=1}^{K} v_{mk} \delta_{ok}$$

The weights of the output layer are updated as:

$$v_{mk} \leftarrow v_{mk} + \varphi \delta_{ok} \varphi_m$$

The weights of the hidden layers are updated using the learning rate α as:

$$v_{nm} \leftarrow w_{nm} + \alpha \delta_{hm} a_n$$

In one implementation, neural network 900 is trained by a gradient descent optimization to compute the error across all the layers. In such an optimization, for an input feature vector x and the predicted output ŷ, the loss function is defined as l for the cost of predicting ŷ when the target is y, i.e. l (ŷ,y). The predicted output ŷ is transformed from the input feature vector x using function $f$. Function $f$ is parameterized by the weights of neural network, i.e. ŷ=$f_w$(x). The loss function is described as l(ŷ,y)=l($f_w$(x),y), or Q(z, w)=l($f_w$(x),y) where z is an input and output data pair (x,y). The gradient descent optimization is performed by updating the weights according to:

$$v_{t+1} = \mu v_t - \alpha \frac{1}{n} \sum_{i=1}^{N} \nabla w_t Q(z_t, w_t)$$

$$w_{t+1} = w_t + v_{t+1}$$

In the equations above, α is the learning rate. Also, the loss is computed as the average over a set of n data pairs. The computation is terminated when the learning rate α is small enough upon linear convergence. In other implementations, the gradient is calculated using only selected data pairs fed to a Nesterov's accelerated gradient and an adaptive gradient to inject computation efficiency.

In one implementation, neural network 900 is trained by a stochastic gradient descent (SGD) to calculate the cost function. A SGD approximates the gradient with respect to the weights in the loss function by computing it from only one, randomized, data pair, $z_t$, described as:

$$v_{t+1} = \mu v - \alpha \nabla w Q(z_t, w_t)$$

$$w_t + 1 = w_t + v_{t+1}$$

In the equations above: $\alpha$ is the learning rate; $\mu$ is the momentum; and t is the current weight state before updating. The convergence speed of SGD is approximately $O(1/t)$ when the learning rate $\alpha$ are reduced both fast and slow enough. In other implementations, neural network 900 uses different loss functions such as Euclidean loss and softmax loss. In a further implementation, an Adam stochastic optimizer is used to train neural network 900.

In one exemplary implementation, some neural networks implementing one or more learning model(s) are implemented as an ensemble of subnetworks trained using datasets widely chosen from approved transactions and flagged transactions, with outputs including classifications of anomalies based upon the input sensed data, and/or remedial actions to be triggered by invoking downstream applications such as preparing and submitting reports to blockchain implemented regulatory compliance information, as well as the capability to both cluster information and to escalate problems. Having described neural network implementations, the discussion now turns to deep learning approaches.

Figure 11:
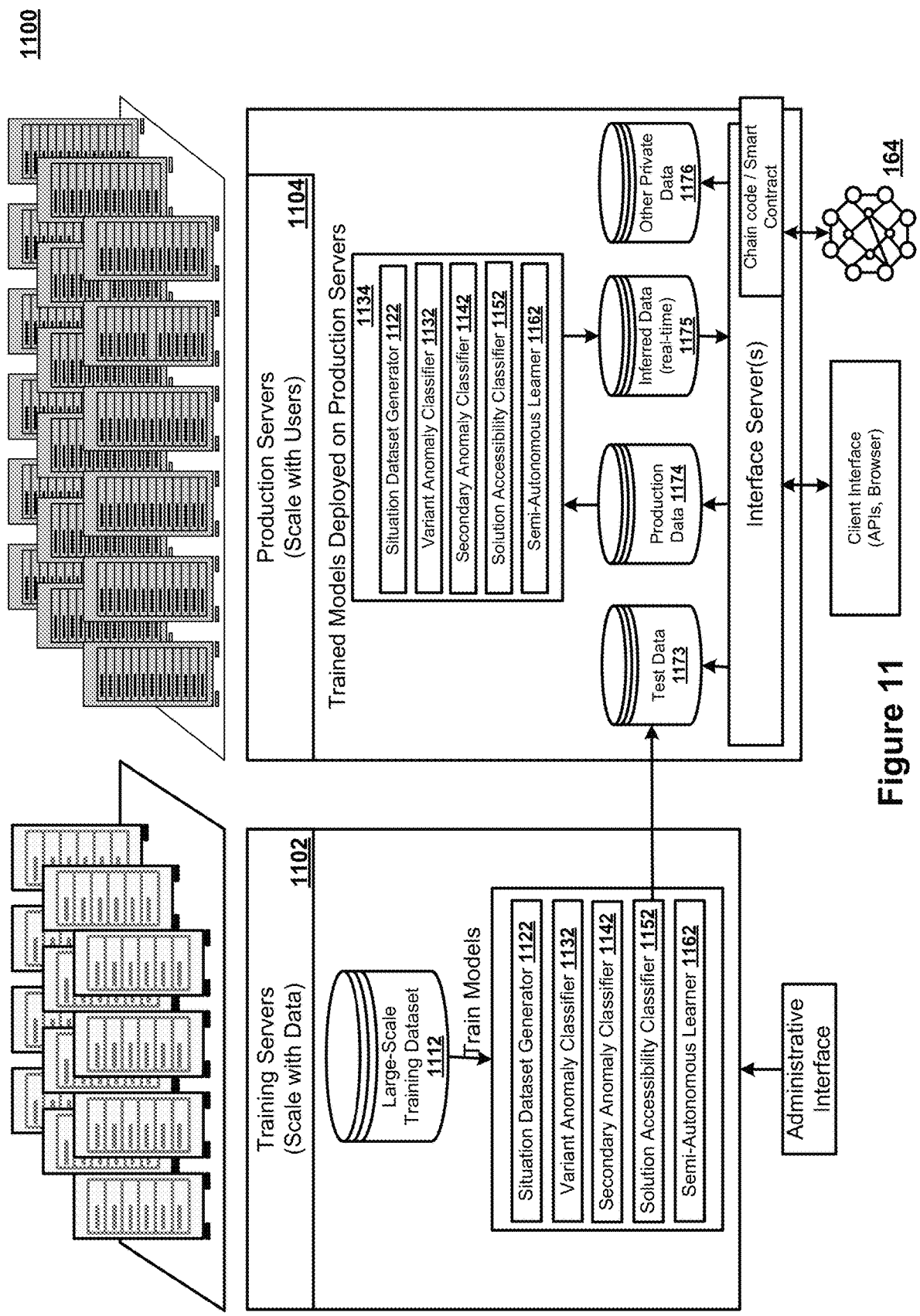
FIG. 11 illustrates a deep learning system in a supervised or semi-supervised implementation.

FIG. 11 illustrates a deep learning system in a supervised or semi-supervised implementation. As shown, deep learning system 1100 includes training servers 1102 and production servers 1104. Large scale training dataset 1112 is accessible to training servers 1102 for training the deep convolutional neural network 1134. In an implementation, deep neural network 1134 includes a first anomaly subnetwork, and a second solution accessibility subnetwork that are trained on one or more training servers 1102. The trained deep neural network ensemble including the first trained anomaly subnetwork, and the trained second solution accessibility subnetwork are deployed on one or more production servers 1104 that receive input anomaly information from requesting client devices. The production servers 1104 process the input anomaly information through at least one of the deep neural network 1134, the first anomaly subnetwork, and the second solution accessibility subnetwork to produce outputs that are transmitted to the client devices.

Training servers 1102 conduct training using models and comprise a situation dataset generator 1122 includes a deep convolutional neural network based variant anomaly classifier, running on numerous processors coupled to memory that prepares training sets comprising data chosen from large scale training dataset 1112 to reflect one or more scenarios being trained, a variant anomaly classifier 1132 includes a deep convolutional neural network based variant anomaly classifier, running on numerous processors coupled to memory that is trained to recognize anomalous situations from sensed data using the scenarios prepared, an optional secondary classifier 1142 includes a deep convolutional neural network based secondary anomaly classifier, running on numerous processors coupled to memory that is trained to recognize special situation anomalies (e.g., radioactive spill, biohazard, etc.), a solution accessibility classifier 1152 includes a deep convolutional neural network based secondary anomaly classifier, running on numerous processors coupled to memory that is trained to recognize anomalies and output identifiers identifying remedial applications that are invoked to trigger remedial actions. A semi-autonomous learner 1162 includes a deep convolutional neural network based variant anomaly classifier, running on numerous processors coupled to memory that progressively augments a set size of the anomaly training set based on the trained ensemble's evaluation of a synthetic set or in implementations, input of live data from a real world scenario.

In one implementation, the neural networks such as situation dataset generator, variant anomaly classifier, secondary anomaly classifier, solution accessibility classifier, and semi-autonomous learner are communicably linked to the storage subsystem comprised of test data database 1173, production data database 1174, inferred data database 1175 and other private data database 1176 and user interface input devices.

In one implementation, data used in one or more of large scale training dataset 1112, test data database 1173, production data database 1174, inferred data database 1175 and other private data database 1176 is selectively obtained from multiple sources of data: (i) various drug databases (e.g., the FDA Product-Specific Guidance database, which enables searching and clustering by active ingredient(s)) and communications including machine reading of emails on recalls minimizes the need to change notification protocols that can be related to machine-readable data and image recognition (e.g. images of pills) and (ii) user responses to deep learning driven follow-up questions selected by the solution accessibility classifier 1152 and semi-autonomous learner 1162 (allowing for live training and refinement).

Privacy Protection Measures

The disclosed system implements a variety of privacy protection measures that will now be summarized to emphasize the tactics by which security risks are minimized. Private keys for all users are always stored locally on mobile devices, and private keys of separate users are sequestered on separate respective devices (i.e., individual recipients either use their own respective recipient device, or in the event that multiple recipients use a shared workgroup device, recipient private keys are stored in a separate keystore and the recipient private key is always erased from the workgroup device following authentication). Because each transaction and interaction with decentralized network 164 is directly tied to a particular user credential, and there is a detailed ledger of any access delegation transactions related to a particular action, each action may be clearly traced back to the specific responsible user.

The plurality of smart contract conditions implemented to limit conditional access delegation to recipients are structured such that access is frequently delegated through an evanescent credential and in the event that an access credential is invalidated or expires, any evidence supporting the recipient at expiry is automatically deleted. In addition to a number of conditional access limitations enacted by smart contracts, access is always revocable in a straightforward process where the administrator uses their own credentials or smart contract credentials to revoke the access credential. A transaction ledger comprises a record of all issuance, provisioning, delegation, and revocation transactions for the maintenance of integrity.

In many implementations of the technology disclosed, systems 100A and 100B have access to one or more external servers corresponding to trusted sources (e.g., government organizations or credentialing agencies) for verification of a recipient's qualifications or clearance level prior to delegating access to a private permissioned function within the enterprise operations. In certain implementations of the technology disclosed, verification and modification logics are configured to verify that a change in user status or privileges is appropriate and enact the proper modification to distributed network 164. Some implementations further include a machine learning classifier trained to detect if a change in user status or privileges is warranted or if a change in user status or privileges is suspected for malicious or inappropriate access.

Enterprises may implement many levels of multi-factor authentication for their users prior to accessing sensitive information or resources. To access a particular application, data source, function, or resource, a user may require the use of two separate items: a mobile device and an additional keystore storing the user's private key. Moreover, one or both of these hardware devices may be configured to exclusively function at a particular location or while connected to a particular network. If a hardware device does not meet these requirements (or any qualifying event occurs resulting in an administrator desiring to restrict access to the device of concern), the device may refuse all authentication attempts or become "bricked" so that it is no longer functional.

A user may also require input of a passcode or biometric prior to authentication into an application. A user device may require close-range communication with a location-specific or administrator-managed hardware device prior to authentication. Any or all of the described authentication methods may be required in a multi-factor authentication process. For example, a user may use facial recognition to unlock a provisioned device, triggering the provisioned device to request communication with a keystore that contains the user private key. For further security, a user may also have to input a passcode to initiate recipient public key generation once the device has obtained a user private key. A user skilled in the art will be familiar with the variety of multi-factor authentication permutations that may be applied to the disclosed system. Devices may also be configured to automatically log a user out or erase any sensitive user information and therefore require re-authentication after a certain pre-determined period of time where the device is idle. If a user fails to successfully complete authentication a pre-determined number of attempts, the user credentials, device credentials, or both sets of credentials may be locked out pending review by an administrator.

For additional regulation of IAM systems, enterprises may also provision user credentials to one or more "super-administrators" responsible for the management of administrative credentials for one or more administrators. As a result of the decentralized structure of the disclosed system, it is simple to lock out a specific user, revoke the user's access credentials, or revoke the user credential entirely without affecting the access of unrelated devices and users. By means of locally-sequestered, self-sovereign user credentials, a breach of the key-value store would not allow a bad actor to impersonate any existing user within the database or directory. In the event that a bad actor obtains the necessary technology to impersonate a particular user and successfully authenticate into the user's access privileges for a period of time before an administrator is able to perform necessary revocations to control the risk, the bad actor will be limited to the particular user's access privileges and associated conditions imposed upon the delegated access (i.e., access to one user's information does not provide a route to access of another user's information, regardless of the breached user account's administrative status or clearance level).

As a result of the described precautions, the disclosed system is resistant to explosion of access rights, under-the-radar outdated access privileges, uncontrolled data leak events, and other sources of inappropriate authentication.

Graphical User Interface

Figure 12:
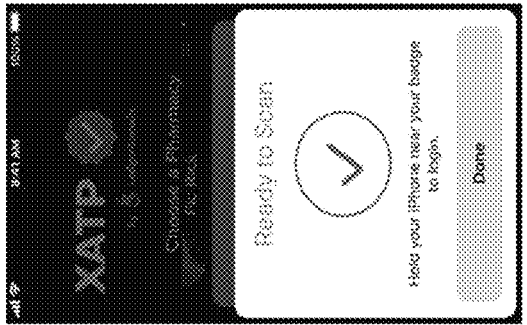
FIG. 12 illustrates a graphical user interface that can be implemented for the technology disclosed.
Figure 12:
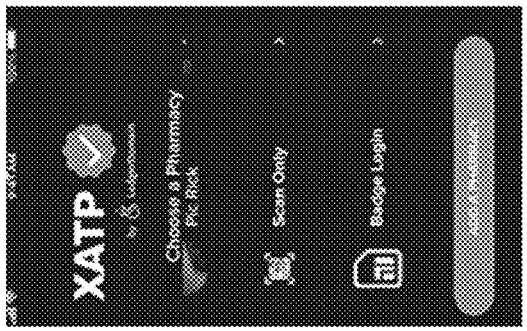
Figure 12:
Figure 12:
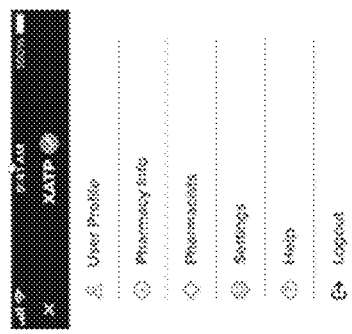
Figure 12:
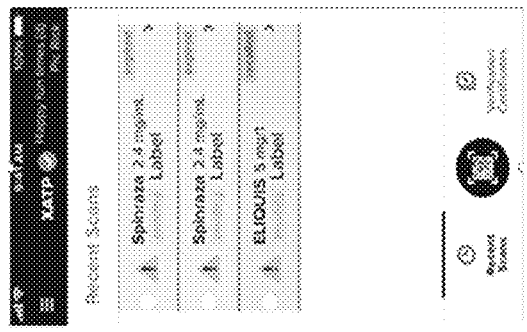

FIG. 12 illustrates a graphical user interface that can be implemented for the technology disclosed. GUI schematic 1204 illustrates workgroup device 128 displaying a user interface for a XATP application that is waiting to receive local communication of a hardware device, such as a recipient keystore, to authenticate a recipient for accessing particular privileges to be accessible when using the workgroup device.

In schematic 1206, the device is prepared to received local communication from a recipient badge. The desired recipient has a uniquely-identifiable RFID badge 118 to be scanned by workgroup device 128 via a tap or similar action, resulting in a user private key being obtained from keystore 118 that can be used to access the recipient's user credential on a key-value store. Once the user credential is decrypted and authentication is successful, the recipient associated with keystore 118 can view sensitive data that the recipient is authorized to access as shown in schematic 1222, or view other user information and settings as shown in schematic 1224.

Computer System

Figure 13:
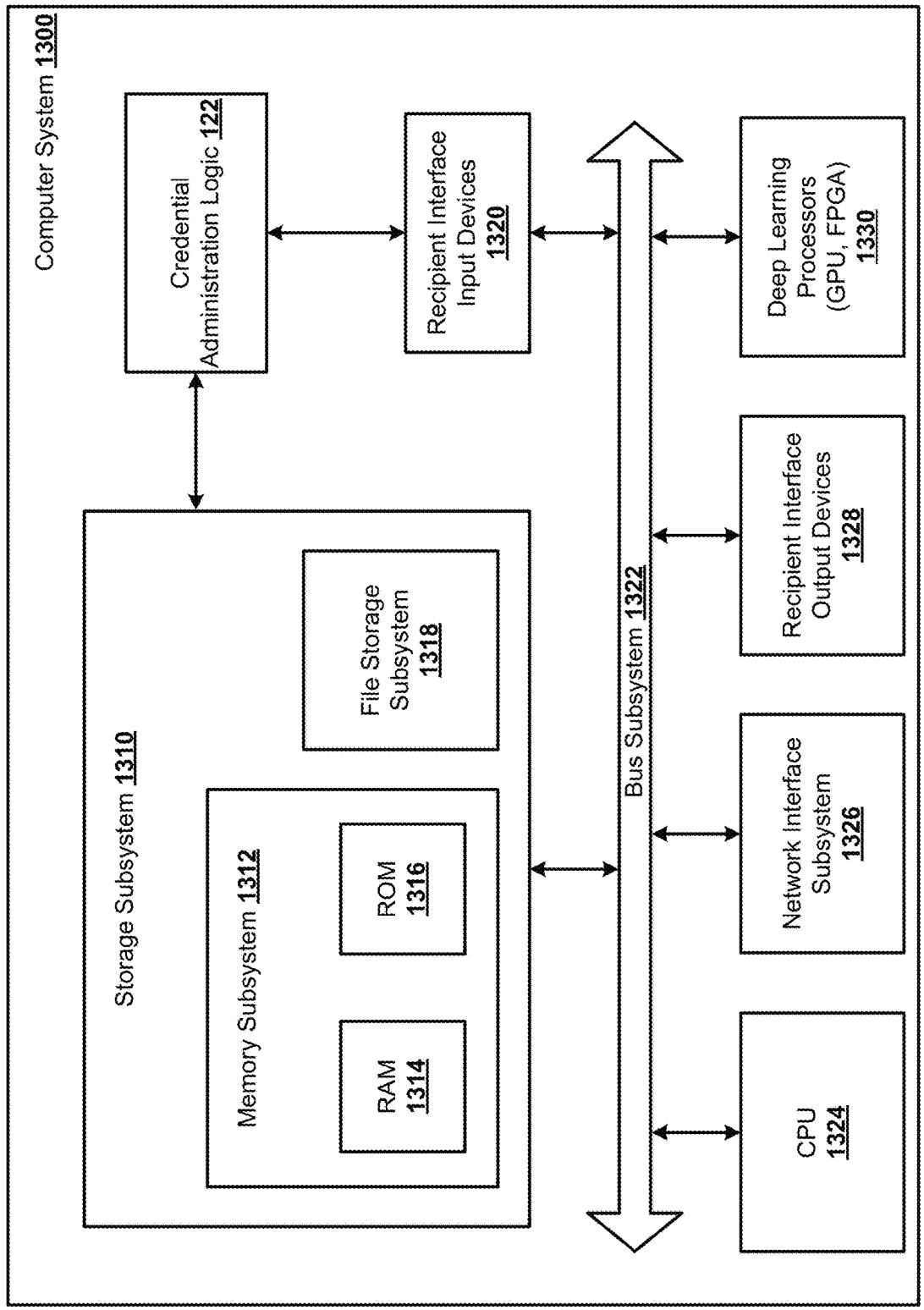
FIG. 13 shows an example computer system that can be used to implement the technology disclosed.

FIG. 13 is a simplified block diagram of a computer system 1300 that can be used for leveraging self-sovereign credentials held on mobile devices to issue user credentials that empower one party to obtain credentialed access to information and resources on behalf of another party, without either party exposing private key information to each other or to the cloud. Computer system 1300 includes at least one central processing unit (CPU) 1324 that communicates with a number of peripheral devices via bus subsystem 1322, and Credential Administration Logic 122, as described herein. These peripheral devices can include a storage subsystem 1310 including, for example, memory devices and a file storage subsystem 1318, user interface input devices 1320 user interface output devices 1328, and a network interface subsystem 1326. The input and output devices allow user interaction with computer system 1300. Network interface subsystem 1326 provides an interface to outside networks, including an interface to corresponding interface devices in other computer systems. Credential Administration Logic 122 is communicably linked to the storage subsystem 1310 and the user interface input devices 1320.

User interface input devices 1320 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1328 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1310 stores programming and data constructs that provide the functionality of some or all of the modules and methods described herein. Subsystem 1310 can be graphics processing units (GPUs) or field-programmable gate arrays (FPGAs).

Memory subsystem 1312 used in the storage subsystem 1310 can include a number of memories including a main random-access memory (RAM) 1316 for storage of instructions and data during program execution and a read only memory (ROM) 1316 in which fixed instructions are stored. A file storage subsystem 1318 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1318 in the storage subsystem 1310, or in other machines accessible by the processor.

Bus subsystem 1322 provides a mechanism for letting the various components and subsystems of computer system 1300 communicate with each other as intended. Although bus subsystem 1322 is shown schematically as a single bus, alternative implementations of the bus subsystem can use multiple busses.

Computer system 1300 itself can be of varying types including a personal computer, a portable computer, a workstation, a computer terminal, a network computer, a television, a mainframe, a server farm, a widely distributed set of loosely networked computers, or any other data processing system or user device. Due to the ever changing nature of computers and networks, the description of computer system 1300 depicted in FIG. 13 is intended only as a specific example for purposes of illustrating the preferred embodiments of the present invention. Many other configurations of computer system 1300 are possible having more or fewer components than the computer system depicted in FIG. 13.

Particular Implementations

We describe some implementations and features for a method of runtime configuration of authentication journeys in the following discussion.

One implementation discloses a method for provisioning user access to one of a set of decentralized networked nodes that share a private permissioned blockchain data structure or a decentralized personal ledger a user credential administration logic, configured to receive from a user seeking credentialling, electronic presentation of one or more instances of electronic evidence personally identifying the user or supporting any credentialling being sought and a keystore to hold access to any credentialling issued. The credential administration logic may include: a credentialing issuance logic, configured to issue a credential being sought by (i) generating a user private key and user public key upon receipt of approval of the electronic evidence; (ii) forwarding a user credential being sought may include the user public key to one of a set of decentralized networked nodes that share a private permissioned blockchain data structure or a decentralized personal ledger; and (iii) expunging any copies of the user private key; and (iii) issuing to the keystore the user private key; thereby credentialling the user to exchange secure messages with nodes of the set of decentralized network nodes; and a privacy protection logic, configured to expunge any evidence personally identifying the user or supporting any credentialling being sought that is evanescent according to a limit of duration.

The technology disclosed may include a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Other embodiments of this technology include corresponding computer systems, apparatus, and computer programs recorded on one or more computer storage devices, each configured to perform the actions of the methods.

Many implementations of the method further include the credentialing issuance logic is further configured to store issued credentials on a physical user device thereby enabling authenticating by a third party user possessing a second credential.

In some implementations, the method further includes encrypting the user credential using (i) an administrative private key and (ii) the user public key to generate an encrypted user credential; and sending the encrypted user credential to a key-value store. The administrative private key may be an ephemeral key. The user credential administration logic can generate the encrypted user credential using a decentralized identity communication (DIDComm) messaging protocol. DIDComm messaging protocol uses the administrative private key as a sender and the user public key as a recipient, and generates the encrypted user credential as a shared secret by executing an Elliptic Curve Diffie-Hellman (ECDH) key exchange. The credential administration logic transmits the encrypted user credential to the key-value store. The encrypted user credential is indexed on the key-value store by the user public key. The user credential administration logic generates the user private key and transmits the user private key to the keystore. The user credential administration logic can be executed on an administrative device. The user private key, user credential, encrypted user credential, and administrative private key are removed from the administrative device after the user private key is transmitted to the keystore. The key-value store may be a distributed network, a blockchain network, or a database. The user credential may include the user public key, a user identifier (ID) of the user, or a digital signature. The user credential may also include metadata information about the user. The user credential administration logic is further configured to use an elliptic curve cryptography function to generate the user public key based on the user private key.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the method further includes a trained neural network classifier is used to generate approval for credentialing the user based at least in part upon the one or more instances of electronic evidence personally identifying the user or supporting any credentialling being sought.

In some implementations of the method, a workgroup logic configured to authenticate a plurality of users in a workgroup by decrypting server-sourced encrypted user credentials using user-controlled user private keys, wherein the workgroup logic may include: a user public key generation logic configured to receive, from a physical keystore, a user private key of a particular user seeking authentication, and generate a user public key of a particular user based on the user private key; a user credential retrieval logic configured to use the user public key to query a key-value store for an encrypted user credential of the particular user, and, in response, receive the encrypted user credential from the key-value store; a user credential decryption logic configured to decrypt the encrypted user credential using the user private key of the particular user, and generate a decrypted user credential of the particular user; and an authentication logic configured to authenticate the particular user using the decrypted user credential. The workgroup logic executes on a workplace device. The user private key is removed from the workplace device after a user is authenticated. The user credential retrieval logic is further configured to use an authentication token of the workplace device to access the key-value store. The user public key generation logic is further configured to receive the user private key from the physical keystore in response to the physical keystore and the workplace device coming within a proximity range. The user public key generation logic is further configured to receive the user private key from the physical keystore in response to the physical keystore and the workplace device tapping against each other. The particular user seeks authentication to a particular application running on the workplace device. The authentication logic is further configured to authenticate the particular user into the particular application using the decrypted user credential. The user credential retrieval logic is further configured to use DIDComm messaging protocol and (ECDH) key exchange receive the encrypted user credential from the key-value store.

Other implementations of the disclosed technology described in this section can include a tangible non-transitory computer-readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A method for provisioning user access to one of a set of decentralized networked nodes that share a private permissioned blockchain data structure or a decentralized personal ledger, to which access has been limited to users authorized by one of the set of decentralized networked nodes, the method comprising:
   receiving from a user seeking credentialling, electronic presentation of one or more instances of electronic evidence personally identifying the user or supporting any credentialling being sought and a keystore to hold access to any credentialling issued; and
   issuing a credential being sought by (i) generating a user private key and user public key upon receipt of approval of the electronic evidence; (ii) forwarding a user credential being sought comprising the user public key to one of the set of decentralized networked nodes that share the private permissioned blockchain data structure or the decentralized personal ledger; and (iii) expunging any copies of the user private key; and (iv) issuing to the keystore the user private key; thereby credentialling the user to exchange secure messages with nodes of the set of decentralized network nodes.

2. The method of claim 1, further including storing issued credentials on a physical user device thereby enabling authenticating by a third party user possessing a second credential.

3. The method of claim 1, further including using a trained neural network classifier, generating approval for credentialing the user based at least in part upon the one or more instances of electronic evidence personally identifying the user or supporting any credentialling being sought.

4. The method of claim 1, further comprising:
   encrypting the user credential using (i) an administrative private key and (ii) the user public key to generate an encrypted user credential; and
   sending the encrypted user credential to a key-value store, and wherein the key-value store is one of: (i) a distributed decentralized network; (ii) a decentralized blockchain network; and (iii) a database.

5. The method of claim 1, wherein the user credential comprises the user public key and at least one of a user identifier (ID) of the user seeking credentialing, a digital signature, and metadata information about the user seeking credentialing.

6. The method of claim 4, wherein the administrative private key is an ephemeral key.

7. The method of claim 4, wherein the encrypted user credential is generated using a decentralized identity communication (DIDComm) messaging protocol, wherein DIDComm messaging protocol uses the administrative private key as a sender and the user public key as a recipient, and generates the encrypted user credential as a shared secret by executing an Elliptic Curve Diffie-Hellman (ECDH) key exchange.

8. The method of claim 4, wherein the encrypted user credential is indexed on the key-value store by the user public key.

9. The method of claim 4, further including generating the user private key and transmitting the user private key to the keystore.

10. The method of claim 1, further including expunging any evidence personally identifying the user or supporting any credentialling being sought that is evanescent.

11. The method of claim 4, wherein the method executes on an administrative device, and further including at least one of:
   (i) removing the user private key from the administrative device after the user private key is transmitted to the keystore,
   (ii) removing the user credential from the administrative device after the user private key is transmitted to the keystore,
   (iii) removing the encrypted user credential from the administrative device after the user private key is transmitted to the keystore, and
   (iv) removing the administrative private key from the administrative device after the user private key is transmitted to the keystore.

12. The method of claim 1, further including using an elliptic curve cryptography function, generating the user public key based on the user private key.

13. The method of claim 1, wherein the keystore is at least one of: (i) a near-field communication (NFC)-enabled device, (ii) a radio-frequency identification (RFID)-enabled device, and (iii) a quick response (QR) code-enabled device.

14. The method of claim 1, further including executing on a workplace device:
   authenticating a plurality of users in a workgroup by decrypting server-sourced encrypted user credentials using user-controlled user private keys, comprising:
      receiving, from a physical keystore, a user private key of a particular user seeking authentication, and generating a user public key of a particular user based on the user private key;
      using the user public key, a key-value store for an encrypted user credential of the particular user, and, in response, receiving the encrypted user credential from the key-value store;
      decrypting the encrypted user credential using the user private key of the particular user, and generating a decrypted user credential of the particular user; and
      authenticating the particular user using the decrypted user credential.

15. The method of claim 14, wherein the user private key is removed from the workplace device after a user is authenticated.

16. The method of claim 14, further including using an authentication token of the workplace device, accessing the key-value store.

17. The method of claim 14, further including receiving the user private key from a physical keystore in response to one of: (i) the physical keystore and the workplace device coming within a proximity range, and (ii) the physical keystore and the workplace device tapping against each other.

18. The method of claim 14, wherein the particular user seeks authentication to a particular application running on the workplace device, further including authenticating the particular user into the particular application using the decrypted user credential.

19. The method of claim 14, further including using DIDComm messaging protocol and (ECDH) key exchange, receiving the encrypted user credential from the key-value store.

20. A system comprising one or more processors coupled to a memory storing instructions for provisioning user access to one of a set of decentralized networked nodes that share a private permissioned blockchain data structure or a decentralized personal ledger, to which access has been limited to users authorized by one of the set of decentralized networked nodes, which instructions, when executed by the one or more processors implement:
   a user credential administration logic, configured to receive from a user seeking credentialling, electronic presentation of one or more instances of electronic evidence personally identifying the user or supporting any credentialling being sought and a keystore to hold access to any credentialling issued; and
   a credentialing issuance logic, configured to issue a credential being sought by (i) generating a user private key and user public key upon receipt of approval of the electronic evidence; (ii) forwarding a user credential being sought comprising the user public key to one of the set of decentralized networked nodes that share the private permissioned blockchain data structure or the decentralized personal ledger; and (iii) expunging any copies of the user private key; and (iv) issuing to the keystore the user private key; thereby credentialling the user to exchange secure messages with nodes of the set of decentralized network nodes.

21. A non-transitory computer readable medium storing instructions for provisioning user access to one of a set of decentralized networked nodes that share a private permissioned blockchain data structure or a decentralized personal ledger, to which access has been limited to users authorized by one of the set of decentralized networked nodes, which instructions when executed by one or more processors perform operations comprising:
   receiving from a user seeking credentialling, electronic presentation of one or more instances of electronic evidence personally identifying the user or supporting any credentialling being sought and a keystore to hold access to any credentialling issued; and
   issuing a credential being sought by (i) generating a user private key and user public key upon receipt of approval of the electronic evidence; (ii) forwarding a user credential being sought comprising the user public key to one of the set of decentralized networked nodes that share the private permissioned blockchain data structure or the decentralized personal ledger; and (iv) expunging any copies of the user private key; and (iii) issuing to the keystore the user private key; thereby credentialling the user to exchange secure messages with nodes of the set of decentralized network nodes.

* * * * *